United States Patent [19]
Kayanuma

[11] Patent Number: 5,930,217
[45] Date of Patent: Jul. 27, 1999

[54] OPTICAL INFORMATION RECORDING/ REPRODUCING SYSTEM, OPTICAL INFORMATION STORAGE MEDIUM, AND MANUFACTURING METHOD THEREOF

[75] Inventor: Kanji Kayanuma, Hadano, Japan

[73] Assignee: Victor Company of Japan, Ltd., Yokohama, Japan

[21] Appl. No.: 09/189,367

[22] Filed: Nov. 9, 1998

Related U.S. Application Data

[62] Division of application No. 08/883,071, Jun. 27, 1997.

[30] Foreign Application Priority Data

Jun. 28, 1996 [JP] Japan ................................ 8-188671

[51] Int. Cl.$^6$ ................................ G11B 5/76; G11B 7/00
[52] U.S. Cl. ................................ 369/59; 369/124
[58] Field of Search ................................ 369/14, 15, 272, 369/273, 124, 275.2, 275.3, 32, 33, 47, 48, 53, 54, 59, 60, 275.1; 235/454

[56] References Cited

U.S. PATENT DOCUMENTS

| | | | |
|---|---|---|---|
| 5,150,339 | 9/1992 | Ueda et al. | 369/275.2 X |
| 5,218,599 | 6/1993 | Tsuyoshi et al. | 369/275.1 |
| 5,241,531 | 8/1993 | Ohno et al. | 369/275.2 |
| 5,324,926 | 6/1994 | Horiguchi et al. | 369/275.3 X |
| 5,497,367 | 3/1996 | Yamagami et al. | 369/275.2 |
| 5,684,785 | 11/1997 | Itami et al. | 369/275.2 |

*Primary Examiner*—Paul W. Huber
*Attorney, Agent, or Firm*—Michael N. Meller; Eugene Lieberstein

[57] ABSTRACT

An optical information storage medium is provided which may be employed as a prepaid card usable as money in limited stores. The optical information storage medium includes a function writable chip which consists of a plurality of memory areas each including a writable region in which information can be written once by a scan of a given beam of light and a read-only region storing therein given information which can be read out by a scan of a given beam of light. Each of the read-only regions includes a scanning guide section and an address storage section.

9 Claims, 9 Drawing Sheets

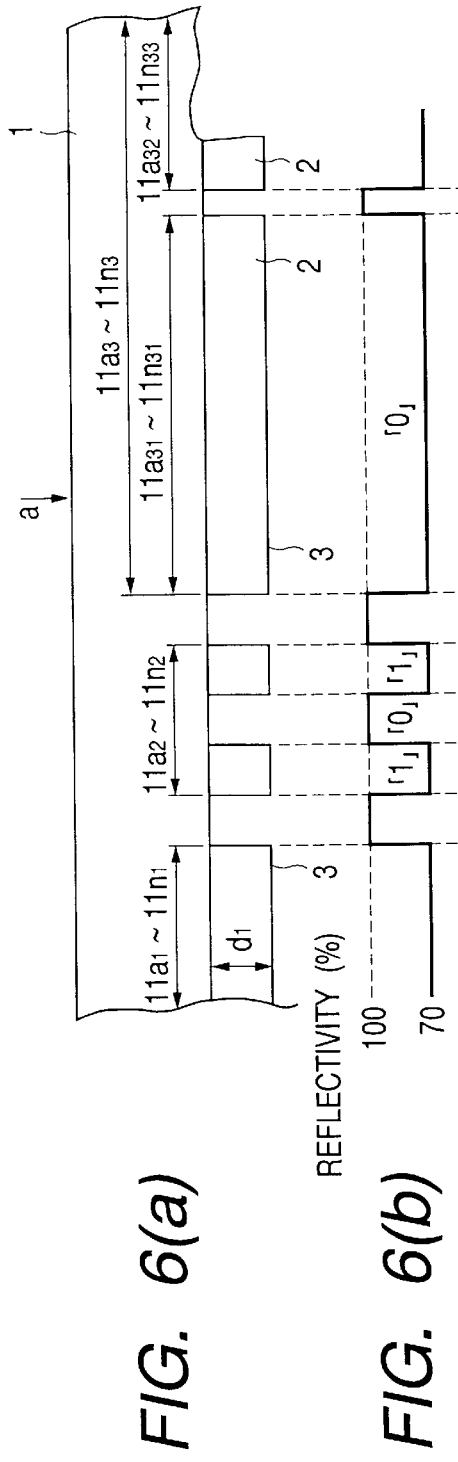

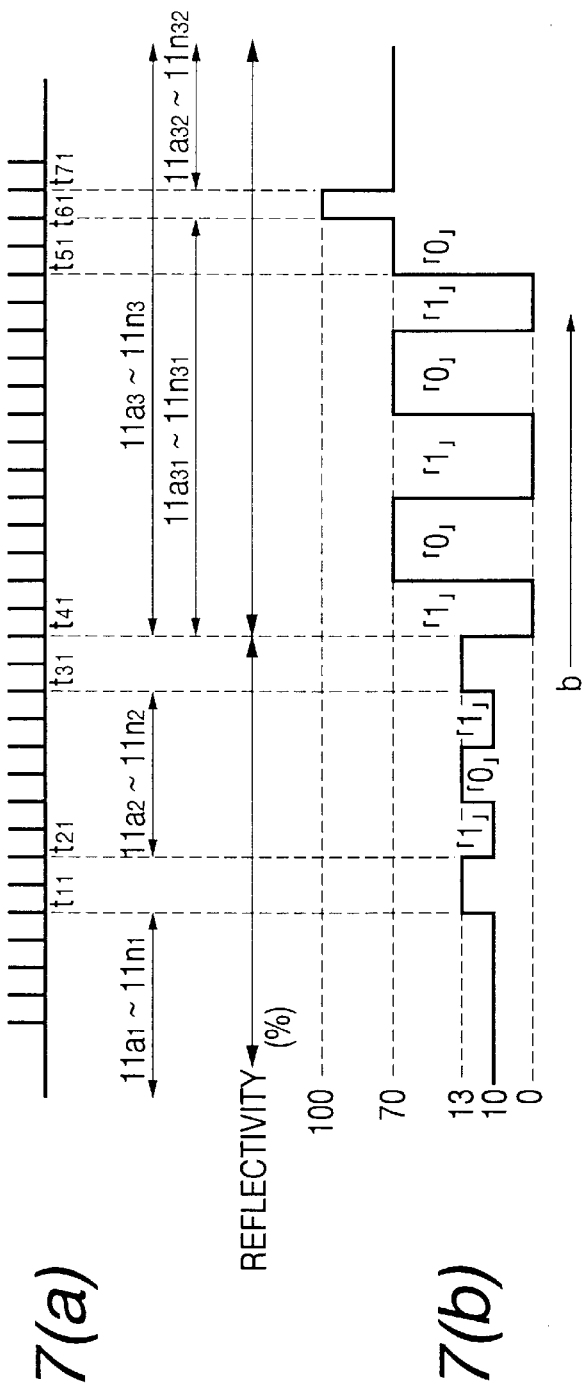
FIG. 7(a)
FIG. 7(b)
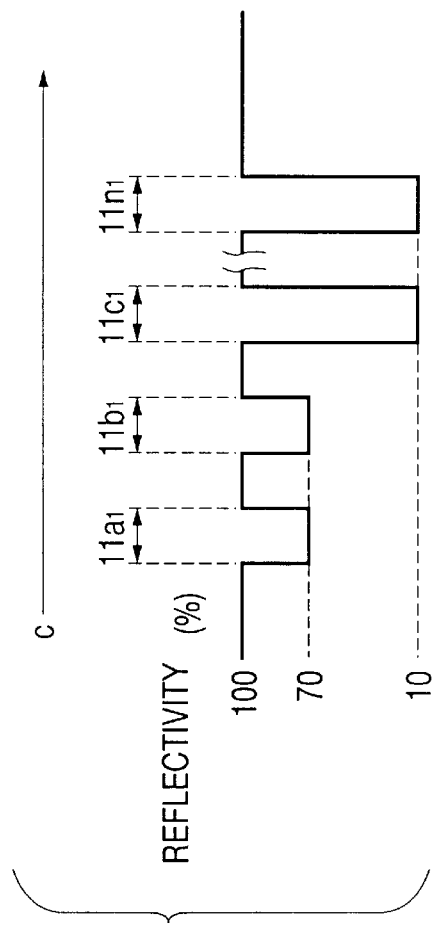
FIG. 8

OPTICAL INFORMATION RECORDING/ REPRODUCING SYSTEM, OPTICAL INFORMATION STORAGE MEDIUM, AND MANUFACTURING METHOD THEREOF

The present invention is a division of U.S. patent application Ser. No. 08/883,071 filed Jun. 27, 1997, pending.

BACKGROUND OF THE INVENTION

1. Technical Field

The present invention relates generally to an improvement on an optical information recording/reproducing system designed to record and reproduce data on and from an optical information storage medium in which data can be written once, such an optical information storage medium, and a manufacturing method thereof.

2. Background of Related Art

FIG. 1 shows a conventional write-once optical disc, as disclosed in Japanese Patent First Publication No. 2-185737 assigned to the same assignee as that of the present application, which has compatibility with a CD (compact disc) in that it has the same standards for reflectivity, modulation of high-frequency signals, symmetry of high-frequency signals, output of tracking signals, and crosstalk.

The write-once optical disc, as indicated at numeral 100, includes generally a transparent substrate 1, an organic film 2, and a metallic film 3. The transparent substrate 1 has formed therein a tracking guide groove G that is a blank groove. The organic film 2 is formed on the transparent substrate 1 and, when irradiated with a recording laser beam L having a preselected wavelength, absorbs a given portion thereof to decrease its refractive index. The metallic film 3 is formed on the organic film 2 for optical reflection.

The organic film 2 is formed so as to reflect 70% or more of the laser beams L before data is recorded thereon in order to show the same reflectivity as that of the CD. The decrease in reflectivity when the organic film 2 is irradiated with the laser beam L after data is recorded thereon is achieved by decreasing the thickness of the organic film 2 to bring the equivalent optical length of the laser beam L close to $\tau/4$ ($\tau$: wavelength).

In order to meet requirements for compatibility with the CD, the contrast between pits and lands, or signal-to-noise ratio of a reproduced signal is increased, taking the level of a tracking signal into account. This may be accomplished by decreasing the depth of the tracking guide groove G to increase the reflectivity of the laser beam L before recording or alternatively increasing the depth of the tracking guide groove G to bring the equivalent optical length of the laser beam L close to $\tau/2$.

FIG. 2 shows another type of write-once optical disc 200, as taught in Japanese Patent First Publication No. 4-205738 assigned to the same assignee as that of this application, which is designed to have compatibility with the CD and has formed thereon a ROM (Read-Only Memory) area retaining information permanently and a RAM (Random-Access Memory) area allowing data to be written therein at all times. In the drawing, the same reference numbers as employed in FIG. 1 refer to the same parts.

The transparent substrate 1 has a diameter of 120 mm. The ROM area occupies an inner portion of the transparent substrate 1 ranging from 25 mm to 35 mm in diameter and has formed therein 130 nm-depth pits Go representing signals meeting the CD-ROM standards. The RAM area occupies an outer portion of the transparent substrate 1 ranging from 35 mm to 58 mm in diameter and has a V-shaped tracking guide groove Ga which is absolute time-modulated using the Wobbling with an amplitude of 30 nm to have a depth of 55 nm and a width of 0.5 $\mu$m and formed at a track pitch of 1.8 $\mu$m. The organic film 2 is formed on the entire surface of the transparent substrate 1 which, when irradiated with the laser beam L having a wavelength of 780 nm, absorbs a given portion thereof to change the refractive index thereof. The reflective metallic film 3 is formed on the organic film 2. The guard film 4 is formed on the metallic film 3.

The matching of the reflectivity of the ROM area with that of the RAM area is achieved by changing the depths of the pits Go and the guide groove Ga in the ROM area or changing the thickness of the organic film 2.

The above write-once optical discs 100 and 200, as described above, show the same reflectivity as that of an information storage surface of the CD and have the organic films 2 on which additional information can be recorded and which is formed on the transparent films 1 having formed thereon the tracking grooves G and Ga, thereby making it easy to reproduce the additional information recorded on the organic films 2 in a conventional CD player.

The write-once optical disc 200 can read information (e.g., tracking information, address information such as track numbers, or money information) out of the ROM area prior to reading information out of the ROM area, record any valuable information usable as money, for example, on the RAM, and reduce the amount of the valuable information on the RAM as needed, but has the drawback in that there is a possibility of the valuable information on the RAM being altered by unauthorized persons.

SUMMARY OF THE INVENTION

It is therefore a principal object of the present invention to avoid the disadvantages of the prior art.

According to one aspect of the present invention, there is provided an optical information storage medium which comprises: (a) a substrate; and (b) a plurality of memory areas formed on said substrate, each including a writable region in which information can be written by a scan of a given beam of light and a read-only region storing therein given information which can be read out by a scan of a given beam of light. Each of the read-only regions includes a scanning guide section and an address storage section.

In the preferred mode of the invention, said memory areas are formed with tracks extending parallel to each other in a surface of said substrate made of a rectangular member.

The memory areas may alternatively be arranged along a single track including horizontal sections extending horizontally and vertical sections extending vertically.

A security information storage area may be provided on said substrate.

Each of said memory areas has arranged therein said scanning guide section, said address storage section, and said writable region in that order. Leading portions of the tracks are aligned with each other in a given direction.

A loading error prevention means is provided in said substrate for avoiding a loading error of the optical information storage medium into a given device.

According to the second aspect of the invention, there is provided an information reproducing method comprising the steps of: (a) holding at a given location an information storage medium including a plurality of memory areas formed on a substrate, each including a writable region in which information can be written by a scan of a recording beam of light and a read-only region storing therein with pits given information which can be read out by a scan of a reproducing beam of light, each of the read-only regions including a scanning guide section and an address storage section; (b) scanning the scanning guide sections of the read-only regions using the reproducing beam of light without scanning the address storage sections and the writable regions; (c) determining reflectivity of each of the scanning guide sections based on a beam of light reflected therefrom; and (d) when one of the scanning guide sections shows only a first level of the reflectivity, scanning corresponding one of the writable regions using the reproducing beam of light to reproduce information when stored in the one of the writable regions.

In the preferred mode of the invention, said memory areas are formed with tracks extending parallel to each other in a surface of the substrate. The reproducing beam of light scans the scanning guide sections in a direction perpendicular to the length of the tracks.

According to the third aspect of the invention, there is provided an information recording apparatus for recording at least quality control information on an optical information storage medium including a plurality of memory areas formed on a substrate, each including a writable region in which information can be written by a scan of a recording beam of light and a read-only region storing therein given information which can be read out by a scan of a reproducing beam of light, each of the writable regions including a quality control information storage section and a specification information storage section, comprising: (a) a holder holding therein said optical information storage medium; (b) an optical head emitting a beam of light to the quality control information storage sections of said optical information storage medium to recording thereon the quality control information; and (c) a head moving mechanism moving said optical head above the quality control information storage sections of said optical information storage medium.

According to the fourth aspect of the invention, there is provided an information recording apparatus for recording at least specification information on an optical information storage medium including a plurality of memory areas formed on a substrate, each including a writable region in which information can be written by a scan of a recording beam of light and a read-only region storing therein given information which can be read out by a scan of a reproducing beam of light, each of the writable regions including a quality control information storage section and a specification information storage section, comprising: (a) a holder holding therein said optical information storage medium; (b) an optical head emitting a beam of light to the specification information storage sections of said optical information storage medium to recording thereon the specification information; and (c) a head moving mechanism moving said optical head above the specification information storage sections of said optical information storage medium.

According to the fifth aspect of the invention, there is provided an information recording apparatus for recording at least specification information on an optical information storage medium including a plurality of memory areas formed on a substrate, each including a writable region in which information can be written by a scan of a recording beam of light and a read-only region storing therein given information which can be read out by a scan of a reproducing beam of light, each of the writable regions including a quality control information storage section and a specification information storage section, each of the read-only regions including a scanning guide section and an address storage section, comprising: (a) a holder holding therein said optical information storage medium; (b) an optical head emitting a beam of light to each of the specification information storage sections of said optical information storage medium to recording thereon the specification information, said optical head also emitting a beam of light to at least each of the scanning guide sections to record therein information indicating that the specification information is stored in corresponding one of the specification information storage sections; and (c) a head moving mechanism moving said optical head above the specification information storage sections and the scanning guide sections of said optical information storage medium.

In the preferred mode of the invention, the quantity of the beam of light emitted to said specification information storage sections is substantially identical with that of a beam of light to record quality control information on the quality control information storage sections.

The quantities of the beams of light emitted to said specification information storage sections and the scanning guide sections are substantially identical with that of a beam of light to record quality control information on the quality control information storage sections.

According to the sixth aspect of the invention, there is provided an information recording/reproducing apparatus comprising: (a) a holder holding therein an optical information storage medium including a plurality of memory areas formed on a substrate, each including a writable region in which information can be written and a read-only region storing therein given information, each of the writable regions including a quality control information storage section and a specification information storage section storing therein specification information; (b) an optical head emitting a reproducing beam of light to at least one of the specification information storage sections of said optical information storage medium to reproduce the specification information therefrom, said optical head also emitting a recording beam of light to the at least one of the specification information storage sections to record erasing information thereon to erase the reproduced specification information therefrom; and (c) a head moving mechanism moving said optical head above the specification information storage sections of said optical information storage medium.

According to the seventh embodiment of the invention, there is provided an information recording/reproducing apparatus comprising: (a) a holder holding therein an optical information storage medium including a plurality of memory areas formed on a substrate, each including a writable region in which information can be written and a read-only region storing therein given information, each of the writable regions including a quality control information storage section and a specification information storage section storing therein specification information, each of the read-only regions including an address storage section and a scanning guide section storing therein information indicating that the specification information is stored on corresponding one of the specification information storage sections; (b) an optical head emitting a reproducing beam of light to each of the scanning guide sections to reproduce the information stored therein for determining whether the specification information is stored on corresponding one of the specification information storage sections or not, if the specification information is determined to be stored in one of the specification information storage sections, said optical head emitting the reproducing beam of light to the one of the specification information storage sections to reproduce the specification information therefrom and then emitting a recording beam of light to the one of the specification information storage sections to record erasing information thereon to erase the reproduced specification information therefrom; and (c) a head moving mechanism moving said optical head above the specification information storage sections of said optical information storage medium.

In the preferred mode of the invention, the quantity of the recording beam of light is greater than the quantity of the reproducing beam of light and the quantity of a beam of light used to store the specification information in each of the specification information storage sections.

The quantity of the reproducing beam of light is smaller than the quantity of a beam of light used to record quality control information on one of the quality control storage sections and the quantity of a beam of light used to record the specification information on one of the specification information storage sections.

According to the eighth aspect of the invention, there is provided a method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of: (a) recording scanning guide information on at least one of the scanning guide sections using a binary code represented by second and fourth of first to fifth signal levels; (b) recording address information on at least one of the address storage sections using a binary code represented by one of a first combination of the first and the second of the first to the fifth signal levels and a second combination of third and fourth of the first to the fifth signal levels; and (c) recording specification information on at least one of the specification information storage sections using a binary code represented by the second and the fourth of the first to the fifth signal levels. The first to the fifth signal levels bear a relation of the first signal level>the second signal level>the third signal level>the fourth signal level>the fifth signal level.

According to the ninth aspect of the present invention, there is provided a method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of: (a) recording scanning guide information on at least one of the scanning guide sections at second of first to fifth signal levels; (b) recording address information on at least one of the address storage sections using a binary code represented by the first and the second of the first to the fifth signal levels; and (c) recording specification information on at least one of the specification information storage sections at the second signal level. The first to the fifth signal levels bear a relation of the first signal level>the second signal level>the third signal level>the fourth signal level>the fifth signal level.

According to the tenth aspect of the invention, there is provided a method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of: (1) performing a first recording operation including the steps of (a) recording scanning guide information on at least one of the scanning guide sections at second of first to fifth signal levels, (b) recording address information on at least one of the address storage sections using a binary code represented by the first and the second of the first to the fifth signal levels, and (c) recording information on at least one of the specification information storage sections at the second signal level; and (2) performing a second recording operation including the steps of (d) recording another scanning guide information on at least one of the scanning guide sections at the fourth signal level and (e) recording specification information on at least one of the specification information storage sections using a binary code represented by the second and the fourth of the first to the fifth signal levels. The first to the fifth signal levels bear a relation of the first signal level>the second signal level>the third signal level>the fourth signal level>the fifth signal level.

According to the eleventh aspect of the invention, there is provided a method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of: (1) performing a first recording operation including the steps of (a) recording scanning guide information on at least one of the scanning guide sections at second of first to fifth signal levels, (b) recording address information on at least one of the address storage sections using a binary code represented by the first and the second of the first to the fifth signal levels, and (c) recording information on at least one of the specification information storage sections at the second signal level; (2) performing a second recording operation including the steps of (d) recording another scanning guide information on at least one of the scanning guide sections at the fourth signal level and (e) recording specification information on at least one of the specification information storage sections using a binary code represented by the second and the fourth of the first to the fifth signal levels; and (3) performing a third recording operation including the steps of (f) recording a binary code represented by the second and the fifth signal levels on at least one of the specification information storage sections to erase the stored specification information therefrom. The first to the fifth signal levels bear a relation of the first signal level>the second signal level>the third signal level>the fourth signal level>the fifth signal level.

In the preferred mode of the invention, the step is further provided which performs a fourth recording operation of changing the second signal level of the binary code stored in the at least one of the specification information storage sections to the fifth signal level.

Each of the first to fifth signal levels is represented by reflectivity that is a ratio of energy carried by a beam of light which is reflected from one of the memory areas to energy carried by the beam of light which is incident on the one of the memory areas.

The first to fifth signal levels are represented by different five of reflectivities ranging from 0% to 100%. For example, the first to fifth signal levels are represented by reflectivities of 100%, 70%, 13%, 10%, and 0%, respectively.

Recording beams of light used in the second to fifth recording operations have first to third quantities of light, respectively, which bear a relation of the first quantity of light<the second quantity of light<the third quantity of light.

According to the twelfth aspect of the invention, there is provided a method of manufacturing optical information storage media each including a base forming thereon a storage area on which a plurality of memories are provided each including a writable region and a read-only region, each of the read-only regions including an address storage section and a scanning guide section, comprising the steps of: (a) forming on a substrate a plurality of memory substrates each constituting the storage area using a copy stamper forming therein molds for the memory substrates; (b) forming a functional colored film, a reflective film, and a protecting film on each of said memory substrates to form the memories thereon; (c) dividing the substrate into a plurality of pieces each having one of said memory substrates; and (d) installing one of the memory substrates on each of the base.

According to the thirteenth aspect of the invention, there is provided a method of manufacturing optical information storage media each including a base forming thereon a storage area on which a plurality of memories are provided each including a writable region and a read-only region, each of the read-only regions including an address storage section and a scanning guide section, comprising the steps of: (a) forming on a substrate a plurality of memory substrates each constituting the storage area by having a copy stamper forming therein molds for molding the memory substrates filled with an optically transparent material; (b) applying functional dye to a portion of each of the memory substrates corresponding to one of the writable regions to form a functional colored film; (c) forming a reflective film over a surface of each of the memory substrates; (d) forming a protecting film on each of said memory substrates to form the memories thereon;

dividing the substrate into a plurality of pieces each having one of said memory substrates; and (e) installing one of the memory substrates on each of the base.

In the preferred mode of the invention, said copy stamper is formed by the steps of (a) applying photoresist to a plate for forming the molds for the memory substrates, (b) masking portions of a surface of the plate other than areas for forming the molds, (c) exposing the surface of the plate to light to form originals of the molds, (d) removing the mask from the plate, (e) electroplating the plate to form a metallic film thereon, and (f) peeling the metallic film from the plate to form the copy stamper.

The copy stamper has formed therein the molds for forming the memory substrates separately.

The plate is rectangular or circular and made of glass.

The installing step installs one of the memory substrates on each of the base by thermally melts a portion of the one of the memory substrates or using adhesive.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings:

FIG. 6(a) shows depressions of a track formed in a function writable chip;

FIG. 6(b) shows a variation in reflectivity of the track shown in FIG. 6(a) before user specification information is recorded;

FIG. 6(c) shows locations of binary codes in a lengthwise direction of a track;

FIG. 6(d) shows a variation in reflectivity of the track shown in FIG. 6(a) after user specification information is recorded;

FIG. 7(a) shows locations of binary codes in a lengthwise direction of a track;

FIG. 7(b) shows a variation in reflectivity of a track when exposed to a strong-record laser beam;

FIG. 8 shows a variation in reflectivity of a track when exposed to a reproduction laser beam;

DESCRIPTION OF THE PREFERRED EMBODIMENT

An optical information storage medium of the present invention may have a variety of shapes such as a circle or a rectangle shape, but the discussion below will refer only to a rectangular optical information storage medium for convenience of explanation.

1 Schematic structure of optical information storage medium

Figure 3:
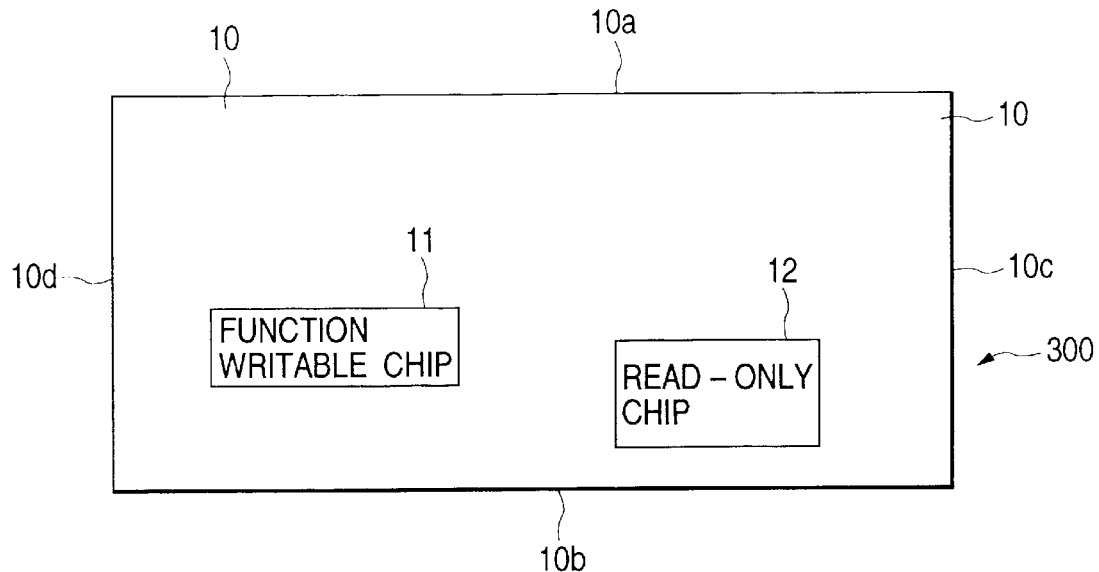
FIG. 3 is a plan view which shows an optical information storage medium according to the present invention.

FIG. 3 shows the optical information storage medium 300 of the invention. The optical information storage medium 300 includes a base 10 which is substantially as large as a calling card or a credit card and has a width of 50 mm and a length of 85 mm. The base 10 is made of a polycarbonate substance having a thickness of approximately 1 mm for inflexibility and has disposed thereon a function writable chip 11 and a read-only chip 12 which are both rectangular in shape. The base 10 may also have formed thereon a magnetic stripe for interchangeability with a conventional optical information storage medium.

The function writable chip 11 is illustrated as being rectangular in shape, but may alternatively have any other configuration such as an ellipse or a circle. Reference numbers 10a, 10b, 10c, and 10d indicate upper, lower, right, and left sides, respectively.

Figure 12:
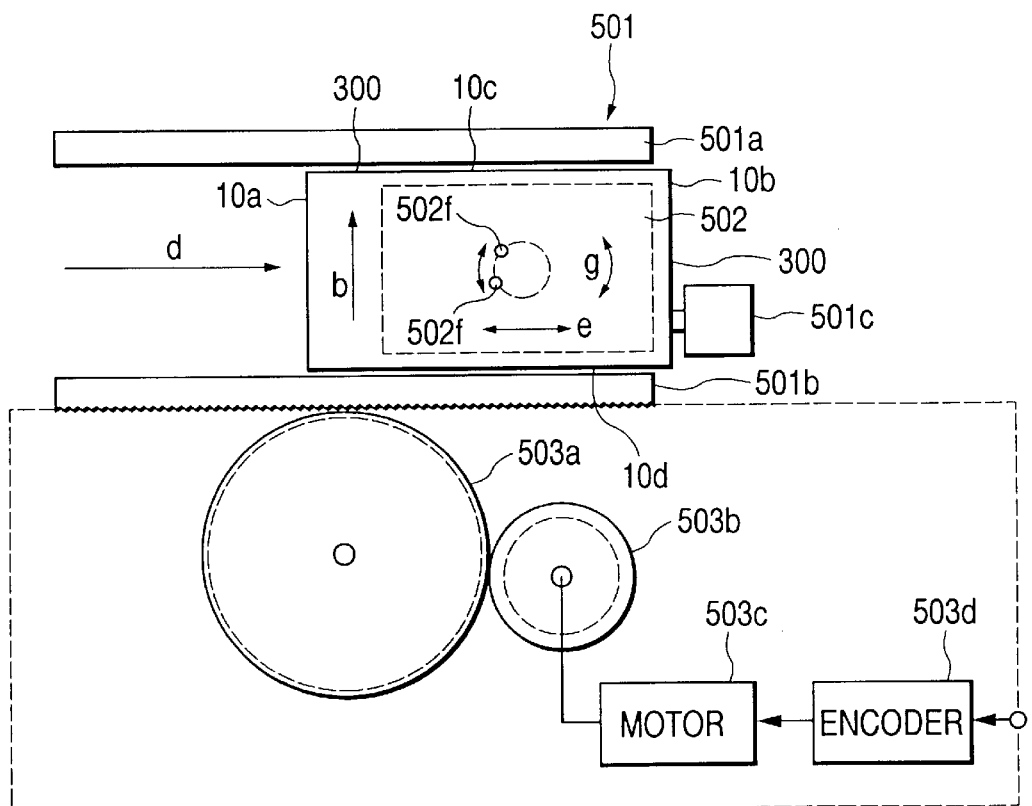
FIG. 12 is a plan view which shows the optical recording/reproducing device in FIG. 11.
Figures 16A, 16B, 16C:
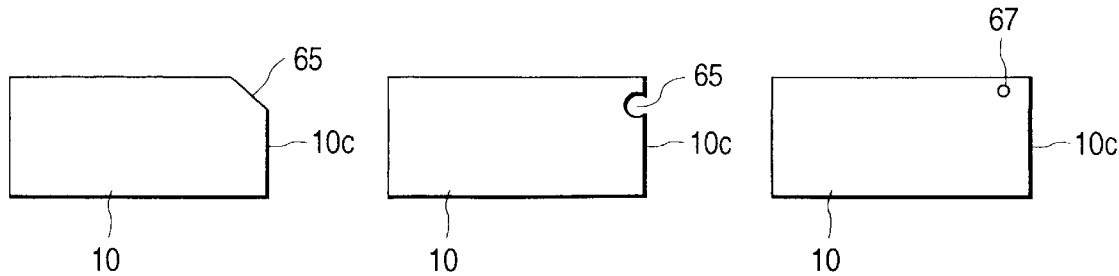
FIG. 16(a) to 16(c) show modifications of a loading error prevention means provided in an optical information storage medium.

The base 10 also takes measures to avoid a medium loading error. For example, a cut-out portion 65, a recess 66, and a hole 67, as shown in FIGS. 16(a) to 16(c), may be formed in any one of the sides 10a to 10d of the base 10. When the optical information storage medium 300 is, as shown in FIG. 12, loaded into a medium holder of an optical recording/reproducing device 500 in a correct orientation from an arrow d, the storage medium 300 is positioned by the right and left sides 10c and 10d held by a feeding guide rail 501a and a feeding gear rack 501b, and the lower surface 10b engaging a stopper 501c, thereby allowing data to be recorded on or read out of the straight tracks of data storage sections 11a to 11n of the function writable chip 11 correctly, but loading of the storage medium 300 in incorrect positions will preclude data from being recorded on or read out of the data storage sections 11a to 11n. For avoiding this problem, the optical recording/reproducing device 500 monitor the presence of the cut-out portion 65, the recess 66, or the hole 67 when the storage medium 300 is loaded thereinto to determine whether the storage medium 300 has been loaded into the medium holder in the correct orientation or not. If the cut-out portion 65, the recess 66, or the hole 67 is not detected, the optical recording/reproducing device 500 determines that the storage medium 300 has not been loaded in the correct orientation and ejects it out of the device 500.

1-1 Function writable chip

The function writable chip 11 has a width of 5 mm and a length of 20 mm and is made of a semiconductor chip having a write-once read-many (WORM) function of allowing quality control information, user specification information, and so forth to be recorded on the data storage sections 11a3 to 11n3, as will be described in detail with reference to FIGS. 4(a) and 4(b), of grooves 11a to 11n and read back many times. The function writable chip 11 is attached to the base 10, but may alternatively be installed in a recess formed in the upper surface of the base 10. The grooves 11a to 11n as shown in FIG. 4(b) extend parallel to each other but may be arranged along a single track turning several times.

1-2 Read-only chip

The read-only chip 12 has a width of 10 mm and a length of 20 mm and records thereon, for example, a transmission holographic pattern as information for security or illegal copy protection. The read-only chip 12 is attached to the base 10, but may alternatively be installed in a recess formed in the upper surface of the base 10.

2 Write-once in function writable chip

The write-once in the data storage sections 11a3 to 11n3 of the function writable chip 11 may be performed when the optical information storage medium 300 is either manufactured, sold, or used, which will be discussed below.

2-1 Write-once when optical information storage medium is manufactured

A manufacturer records given quality control information such as a manufacturer code, a manufacturing date, a lot number, and a manufacturing device number on quality control information storage sections 11a32 to 11n32 in the data storage sections 11a3 to 11n3 using a data recording device (not shown) before shipping.

The data storage sections 11a3 to 11n3 also include user specification information storage sections 11a31 to 11n31 in which user specification information can be written once by an authorized person as needed.

2-2 Write-once when optical information storage medium is sold

A store writes, for example, 1,000 yen worth of money data usable at limited stores in the user specification information storage sections 11a31 to 11n31 of the data storage sections 11a3 to 11n3 and sells through a data storage and vending machine (not shown) the optical information storage medium 300 as a prepaid card, a gift certificate, a telephone card which is worth "105" call unit, or a coupon ticket according to the request of a purchaser. In the following discussion, it will be assumed that the optical information storage medium 300 is processed as a prepaid card.

2-3 Write-once when optical information storage medium is used

When a purchaser or card user buys merchandise using the optical information storage medium 300, a seller reduces or erases a portion the user specification information corresponding to the price of the merchandise from the user specification information storage sections 11a31 to 11n31 of the data storage sections 11a3 to 11n3 using a store's data reproducing/erasing device (not shown) so as to prevent the erased portion of the user specification information from being recovered and returns it to the user. If the user specification information has already been consumed in full, the optical information storage medium 300 is not returned to the user or returned after the function writable chip 11 is broken optically or physically so that it cannot be reused.

3 Protection against illegal alternation of user specification information

If any defect is found due to manufacture in the optical information storage medium 300 after being put on the market, the quality control information recorded by the manufacturer is looked up to specify a name of the manufacturer, a manufacturing date, a lot number, and a manufacturing machine in order to clear up the cause.

The user specification information is, as described above, the money data which is written in the optical information storage medium 300 when sold as a prepaid card and which is erased partially or fully by the price of a purchase in a store. If such a user specification information is recorded in a writable storage medium, there is a possibility that a consumed portion of the user specification information is recovered by an unauthorized person. It is, thus, important to protect data recorded on the optical information storage medium 300 from being altered illegally. As such protection, destruction of a consumed portion of user specification information and illegal copy protection for an unused optical information storage medium, as discussed below, may be considered.

3-1 Destruction of consumed portion of user specification information

A portion of the user specification information consumed by the purchase of a commodity is destroyed completely so that it cannot be recovered by unauthorized persons. In practice, the consumed portion of the user specification information is erased or destroyed optically by irradiating a strong-record laser beam 80, as will be discussed later, greater in quantity of light than a weak-record laser beam 70 which was used to record the user specification information, onto a corresponding portion of the user specification information storage sections 11a31 to 11n31 of the data storage sections 11a3 to 11n3 or may alternatively be destroyed physically by punching a hole in the corresponding portion of the user specification information storage sections 11a31 to 11n31.

Figure 4A:
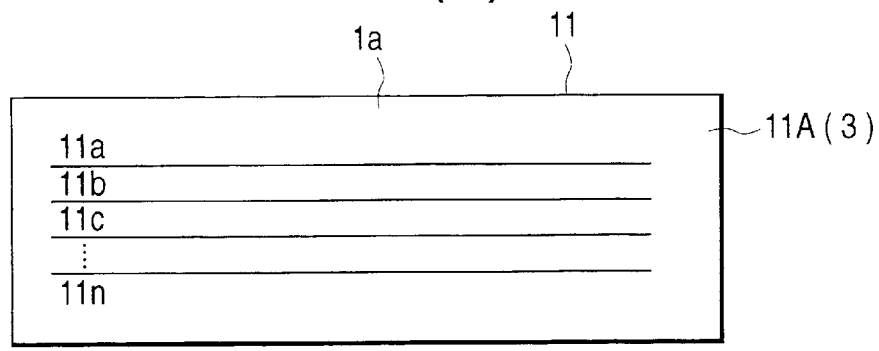
FIG. 4(a) is an enlarged view which shows a function writable chip mounted on the optical information storage medium in FIG. 3.
Figure 4B:
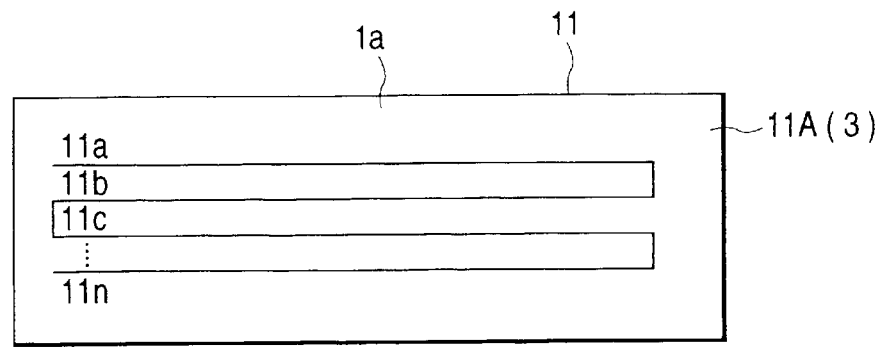
FIG. 4(b) is an enlarged view which shows a modification of a function writable chip.

The determination of whether the user specification information is unused or destroyed partially or fully may be made by irradiating a reproduction laser beam 90 onto the grooves 11a to 11n, as shown in FIG. 4(a), to determine the reflectivity of light reflected therefrom and comparing it with a reflectivity relation between a flat surface 1a of a base 11A of the writable chip 11 and the grooves 11a to 11n (the reflectivity of the flat surface 1a>the reflectivity of the grooves 11a to 11n) due to the difference in phase angle between incident light and reflected light produced by the optical path difference therebetween.

3-2 Illegal copy protection for unused optical information storage medium

The read-only chip 12 in which the transmission holographic pattern is written as security information is, as described above, installed on the base 10 along with the function writable chip 11. It is impossible to copy the security information formed with the transmission hologram without use of special machines only limited manufacturers usually have.

The security information formed with the transmission hologram can be read out only by a hologram reader. The hologram reader is installed in the data recording/reproducing device used at a store when the card user buys a commodity and reads the security information out of the optical information storage medium 300 to compare it with a security reference information prestored in the data recording/reproducing device. If the security information read out of the optical information storage medium 300 is matched with the security reference information, the read security information is determined to be correct.

When the read security information is determined to be correct and when the reflectivity of the reproduction laser beam 90 radiated onto the user specification information shows a given value, the data recording/reproducing device determines the user specification information recorded on the optical information storage medium 300 to still be unused. The data recording/reproducing device also determines whether the amount of money written in the user specification information is greater than or equal to the price of a commodity the card user wants to buy or not. If so, the data recording/reproducing device allows the card user to buy the commodity.

4 Detailed structure of function writable chip

Figures 5A, 5B:
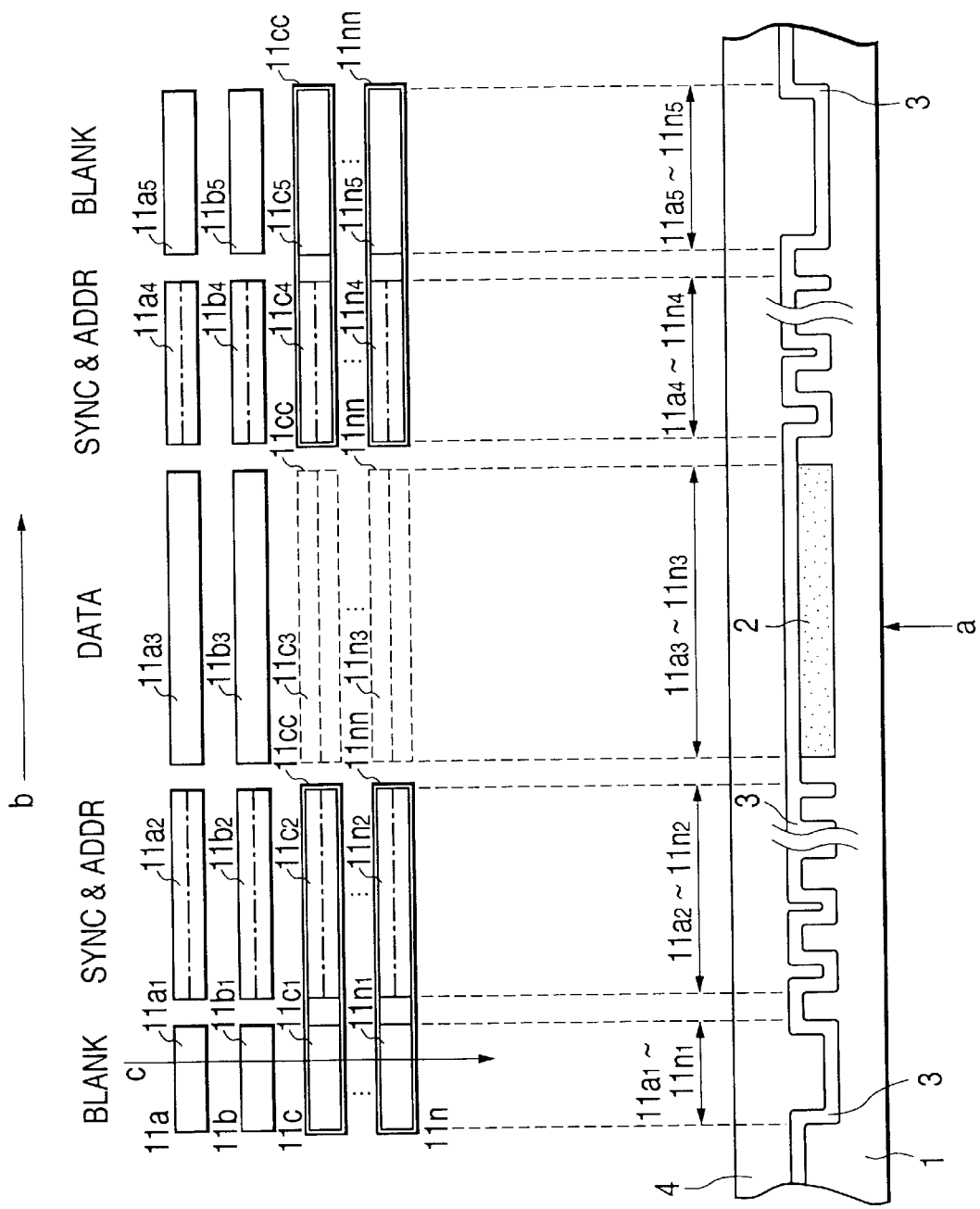
FIG. 5(a) is a plan view which shows a track layout of a function writable chip.
FIG. 5(b) is a cross sectional view which shows a track in a lengthwise direction.

The function writable chip 11, as shown in FIGS. 4 to 5(b), includes the base 11A having formed therein the straight tracks of grooves 11a to 11n. The groove 11a, as shown in FIGS. 5(a) and 5(b), includes a blank section 11a1, a synchronization section 11a2, a data recording section 11a3, a synchronization section 11a4, and a blank section 11a5 which are aligned at intervals away from each other. Similarly, the groove 11b includes a blank section 11b1, a synchronization section 11b2, a data recording section 11b3, a synchronization section 11b4, and a blank section 11b5 which are aligned at intervals away from each other. The groove 11c includes a blank section 11c1, a synchronization section 11c2, a data recording section 11c3, a synchronization section 11c4, and a blank section 11c5 which are aligned at intervals away from each other. The groove 11n includes a blank section 11n1, a synchronization section 11n2, a data recording section 11n3, a synchronization section 11n4, and a blank section 11n5 which are aligned at intervals away from each other. Leading portions of the blank sections 11a1 to 11n1 of all the grooves 11a1 to 11n1 are aligned with each other in a direction perpendicular to the length of the grooves 11a to 11n.

The function writable chip 11 meets the following specifications:

1. size: 5 mm×20 mm
2. storage capacity: 100 kByte (a total capacity of the grooves 11a to 11n, i.e., the synchronization sections 11a2 to 11n2, the data storage sections 11a3 to 11n3, and the synchronization sections 11a4 to 11n4)
3. effective storage area: 1 mm×15 mm (a portion of the base 11A on which the grooves 11a to 11n are formed)
4. the number of tracks: 200 (the number of the grooves 11a to 11n)
5. actual storage capacity per track: 500 Byte
6. cluster size: one sector per track (one sector (information unit) is recorded on each of the tracks of the grooves 11a to 11n)
7. track pitch: 4.8 μm (interval between adjacent two of the grooves 11a to 11n)
8. shortest pit length: 6 μm (in the longitudinal direction of the synchronization sections 11a2 to 11n2, the data storage sections 11a3 to 11n3, and the synchronization sections 11a4 to 11n4)
9. record modulation format: EFM (Eight-to-Fourteen Modulation of information to be written in the data storage sections 11a to 11n3, read-solomon codes are used as error codes)
10. length of each of the blank sections 11a1 to 11n1: 2.5 mm
11. length of each of the synchronization sections 11a2 to 11n2: 1.5 mm
12. length of each of the data storage sections 11a3 to 11n3: 12.5 mm
13. length of each of the synchronization sections 11a4 to 11n4: 1.5 mm
14. length of each of the blank sections 11a5 to 11n5: 2.5 mm In order to protect data recorded on the data storage sections 11a3 to 11n3 from being altered by unauthorized persons and improve retaining of the data, an interleaving operation is performed. Error correction codes are added over 50% of a data array.

Figure 10:
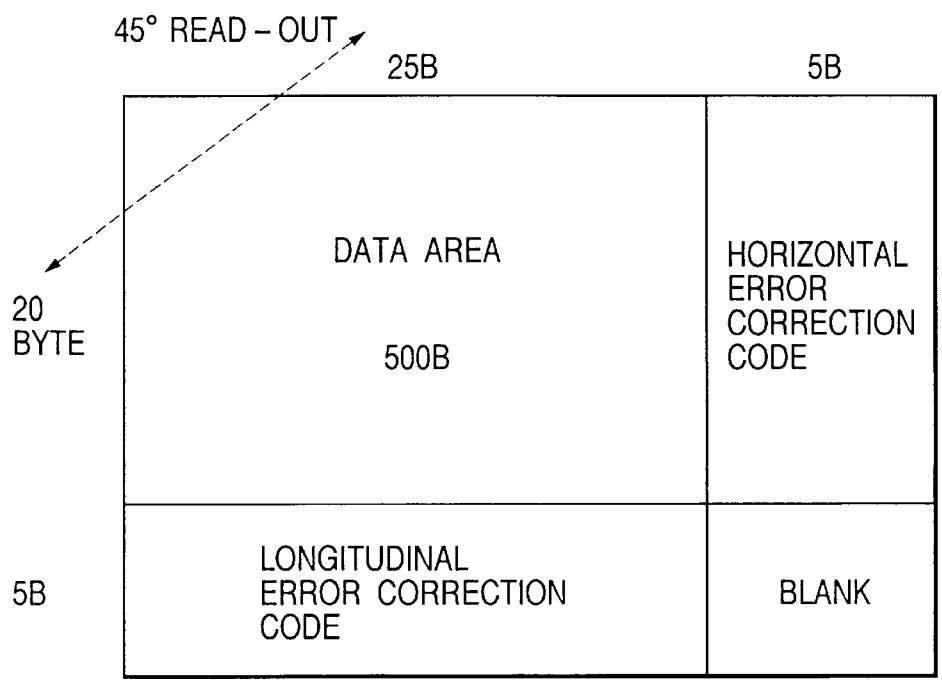
FIG. 10 shows a data array of error correction codes written in a function writable chip.

FIG. 10 shows a data array in each of the grooves 11a to 11n which includes a data area 500B having an actual storage capacity of 500 Byte (20 Byte×25 Byte), a longitudinal error correction code area having a storage capacity of 125 Byte (5 Byte×25 Byte), and a horizontal error correction code area having a storage capacity of 100 Byte (20 Byte×5 Byte). This establishes an error rate of $10^{-12}$ Byte or less after error correction. The high-accuracy error correction of reproduced information is achieved by scanning the longitudinal error correction code area and the horizontal error correction code area and the data area 500B in an angular direction of 45°.

Figure 1:
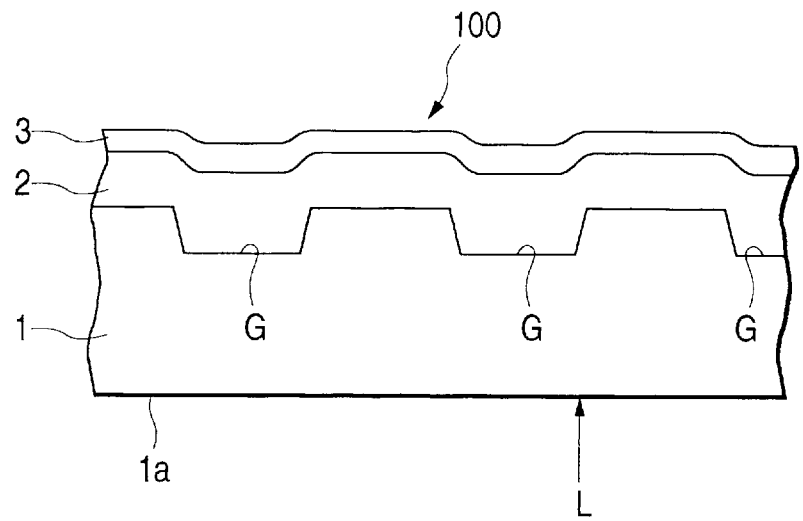
FIG. 1 is a cross sectional view which shows a conventional optical information storage medium.

The blank sections 11a1 to 11n1 and 11a5 to 11n5 arranged on both ends of the grooves 11a to 11n correspond to the tracking guide groove G of the write-once optical disc 100 as shown in FIG. 1. A change in reflectivity of each of the blank sections 11a1 to 11n1 and 11a5 to 11n5 may be achieved by emitting a laser beam to break or change the shapes of pits in each of the blank sections 11a1 to 11n1 and 11a5 to 11n5. The blank sections 11a5 to 11n5 may be removed as needed.

Specifically, in the function writable chip 11 wherein data is not stored in the data storage sections 11a3 to 11n3 at all after manufacture (sometimes referred to as the unused function writable chip, hereinafter), the blank sections 11a1 to 11n1 each show a reflectivity of 70% as shown in FIG. 6(b). In the function writable chip 11 after exposed to weak-record or strong-record laser beam 70 and 80, as will be described later in detail, the blank sections 11a1 to 11n1 each show a reflectivity of 10%, as shown in FIGS. 6(d) and 7(b). The use of an erasing laser beam 95 greater in quantity of light than the weak-record laser beam 70 and the strong-record laser beam 80 decreases the reflectivity to zero (0%).

Figure 2:
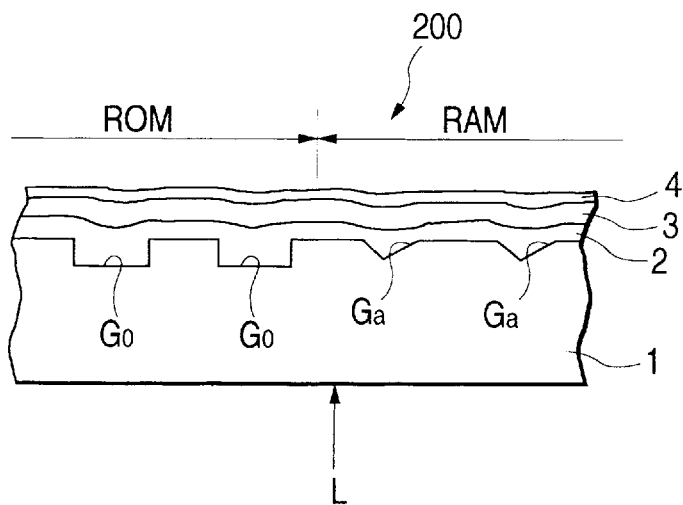
FIG. 2 is a cross sectional view which shows another conventional optical information storage medium.

The synchronization sections 11a2 to 11n2 and 11a4 to 11n4 preceding and following the data storage sections 11a3 to 11n3 correspond to the pits Go, as shown in FIG. 2, in the ROM area of the write-once optical disc 200. A change in reflectivity of each of the synchronization sections 11a2 to 11n2 and 11a4 to 11n4 may be achieved by emitting a laser beam to break or change the shapes of pits in each of the synchronization sections 11a2 to 11n2 and 11a4 to 11n4. The synchronization sections 11a4 to 11n4 may be removed as needed.

Specifically, each of the synchronization sections 11a2 to 11n2 of the unused function writable chip 11 stores therein, for example, a 3-bit code "101" represented by, as illustrated in FIG. 6(b), reflectivities of 70%, 100%, and 70%y. The exposure to the weak-record and strong-record laser beams 70 and 80 changes, as shown in FIGS. 6(d) and 7(b), reflectivities of each of the synchronization sections 11a2 to 11n2 to 10%, 13%, and 10%, respectively. The change in reflectivity of each bit of the synchronization sections 11a2 to 11n2 depends upon a value of each bit so that the 3-bit code "101" can be read out precisely regardless of whether the data is recorded on the data sections 11a3 to 11n3 of the function writable chip 11.

The synchronization sections 11a2 to 11n2 and 11a4 to 11n4 may store therein a sequence of 8-bit address codes designating memory locations of as much as 200 tracks of the grooves 11a to 11n. For example, each of the synchronization sections 11a2 and 11a4 for the first track of the groove 11a stores therein "00000001". Each of the synchronization sections 11b2 and 11b4 for the second track of the groove 11b stores therein "00000010".

The data storage sections 11a3 to 11n3 correspond to the RAM areas (write-once areas) of the write-once optical disc 100, as shown in FIG. 1, formed with laminated layers consisting of the transparent substrate 1, the organic film 2 whose refractive index decreases when the transparent substrate 1 is exposed to the weak-record laser beam 70, and the reflective metallic film 3. Each of the data storage sections 11a3 to 11n3 has the reflectivity changing when exposed to the weak-record laser beam 70 and the strong-record laser beam 80. Specifically, the data storage sections 11a3 to 11n3 is irradiated with the weak-record laser beam 70 to record therein the user specification information, as discussed above, while when irradiated with the strong-record laser beam 80, part of the user specification information exposed to the strong-record laser beam 80 is broken or erased.

For example, when the optical information storage medium 300 is used as 10,000 yen worth of a prepaid card, 1,000 yen worth of money data is recorded on each of the data storage sections 11a3 to 11j3 of the ten (10) grooves 11a to 11j.

When the same 1,000 yen worth of money data may be recorded on the synchronization sections 11a2 to 11j2 and the synchronization sections 11a4 to 11j4. This allows the optical information storage medium 300 to be determined as being altered by unauthorized persons if data stored in the synchronization sections 11a2 to 11j2 and 11a4 to 11j4 is not matched with that stored in the data storage sections 11a3 to 11j3.

4-1 Weak-record on data storage sections

Figure 9:
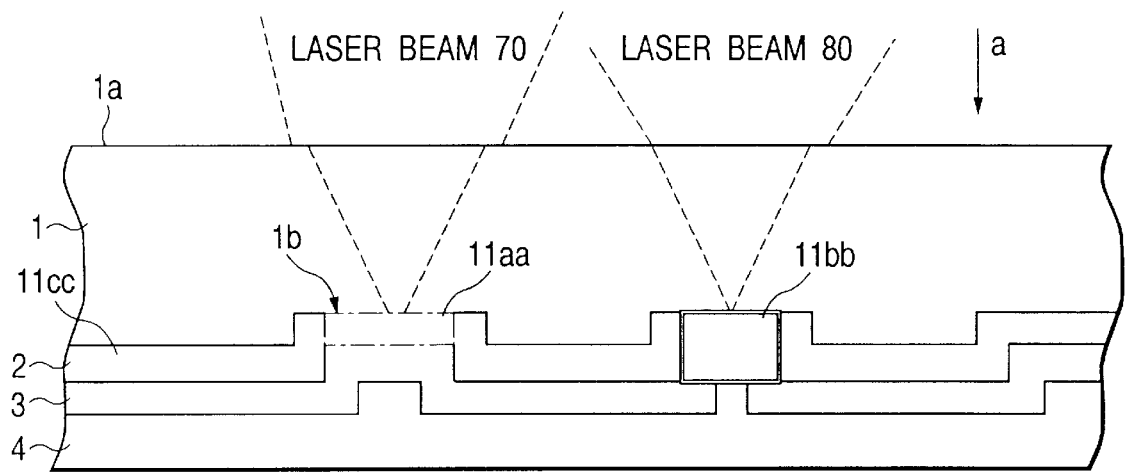
FIG. 9 is a longitudinally cross sectional view which shows a function writable chip.

The weak-record laser beam 70 is, as shown in FIG. 9, emitted from a direction a onto each of the data storage sections 11a3 to 11n3. The weak-record laser beam 70 emitted to the data storage section 11a3 travels up to the colored storage portion 11aa of the organic film 2 through the upper surface 1a, the transparent substrate 1, and the pit 1b. Specifically, the weak-record laser beam 70 stops at the colored storage portion 11aa without reaching the metallic film 3. The colored storage portion 11aa absorbs part of the weak-record laser beam 70 to decrease its refractive index partially so that the reflectivity of corresponding one of the data storage sections 11a3 to 11n3 is changed partially from 70%, as shown in FIG. 6(b), to 10%, as shown in FIG. 6(d), according to the user specification information. FIG. 6(d) exemplifies one of the data storage sections 11a3 to 11n3 on which the user specification information "101010" is recorded. In FIG. 7, a reference number 4 indicates a protecting film.

4-2 Strong-record on data storage sections

The strong-record laser beam 80 having the quantity of light greater than that of the weak-record laser beam 70 is, as shown in FIG. 9, emitted from the direction a onto each of the data storage sections 11a3 to 11n3. The strong-record laser beam 80 emitted to the data storage section 11a3 travels up to the colored storage portion 11aa of the organic film 2 through the upper surface 1a, the transparent substrate 1, and the pit 1b. Upon reaching the colored storage portion 11aa, the strong-record laser beam 80 destroys it and reaches the metallic film 3. This causes the reflectivity of corresponding one of the data storage sections 11a3 to 11n3 to be changed partially from 70%, as shown in FIG. 6(b), to 0%, as shown in FIG. 7(b). Specifically, the destruction of the user specification information "101010" by the strong-record laser beam 80 changes the reflectivity of corresponding one of the data storage sections 11a3 to 11n3 to a sequence of 0%, 70%, 0%, 70%, 0%, and 70% according to binary numbers "1", "0", "1", "0", "1", and "0" representing the user specification information.

As apparent from the above discussion, each of the data storage sections 11a3 to 11n3 of the function writable chip 11 before use has no user specification information so that the reflectivity thereof shows zero, as shown in FIG. 6(b).

After exposed to the weak-record laser beam 70, each of the data storage sections 11a3 to 11n3 of the function writable chip 11 has the reflectivities of 10%, 70%, 10%, 70%, 10%, and 70%, as shown in FIG. 6(d), according to the binary numbers "1", "0", "1", "0", "1", and "0" representing the user specification information.

After exposed to the strong-record laser beam 80, each of the data storage sections 11a3 to 11n3 of the function writable chip 11 has the reflectivities of 0%, 70%, 0%, 70%, 0%, and 70%, as shown in FIG. 7(b), according to the binary numbers "1", "0", "1", "0", "1", and "0" representing the user specification information.

Therefore, the user specification information written in the data storage sections 11a3 and 11n3 by the weak-record laser beam 70 is reproduced easily by monitoring a combination of reflectivities of each of the data storage sections 11a3 to 11n3 of the function writable chip 11 to convert reflectivities of 70% and 10% into the logical 0 and logical 1, respectively.

It is, however, impossible to reproduce the user specification information on one of the data storage sections 11a3 to 11n3 correctly after exposed to the strong-record laser beam 80 because the reflectivity of the one of the data storage sections 11a3 and 11an has been changed partially to 0%.

The longitudinal section of each of the grooves 11a to 11n in FIG. 5(a) is shown in FIG. 5(b). The reflective metallic film 3 is formed on the transparent substrate 1 and the organic film 2 and covered with the protecting film 4. In the drawing, a indicates the direction in which the weak-record laser beam 70, the strong-record laser beam 80, the reproduction laser beam 90, and the erasing laser beam 95 enter the transparent substrate 1.

The weak-record laser beam 70, the strong-record laser beam 80, the reproduction laser beam 90, and the erasing laser beam 95 have different quantities of light, but show the same wavelength (e.g., 780 nm). Specifically, these laser beams 70, 80, 90, and 95 bear the relation of the quantity of light of the erasing laser beam 95>the quantity of light of the strong-record laser beam 80>the quantity of light of the weak-record laser beam 70>the reproduction laser beam 90.

For example, when the wavelength of each laser beam is 780 nm, the numerical aperture NA of an objective 502f, as will be discussed later in detail, is 0.45, and the recording speed of the optical information storage medium 300 in the direction b in FIGS. 5(a), 6(a) to 6(d), 7(a), and 7(b) is 1.2 m/s, the quantities of light of the laser beams 70, 80, 90, and 95 are 1. the reproduction laser beam 90: 0.3 mW
2. the weak-record laser beam 70: 3 mW to 6 mW
3. the strong-record laser beam 80: 12 mW to 20 mW
4. the erasing laser beam 95: 30 mW to 40 mW
5 Records on optical information storage medium Records of the optical information storage medium 300 before use, after recorded using the weak- and strong-record laser beams 70 and 80, and after erased using the erasing laser beam 95 will be discussed below.

5-1 Record on optical information storage medium before use

The grooves 11a to 11n of the function writable chip 11 of the optical information storage medium 300 before the user specification information is recorded have the following reflectivities:

1. the blank sections 11a1 to 11n1: the logical 0 showing a reflectivity of 70% is stored in each of the blank sections 11a1 to 11n1
2. the synchronization sections 11a2 to 11n2: a binary code (e.g., "101" in FIG. 6(b)) is stored in each of the synchronization sections 11a2 to 11n2 using a combination of reflectivities of 100% and 70% (the logical 0=a reflectivity of 100%, the logical 1=a reflectivity of 70%).
3. the data storage sections 11a3 to 11n3: the data storage sections 11a3 to 11n3 consist of the quality control information storage sections 11a32 to 11n32 and the user specification information storage sections 11a31 to 11n31. The logical 0 is stored in each of the user specification information storage sections 11a31 to 11n31 with a reflectivity of 70%. Binary codes indicating a name of a manufacturer, a manufacturing date, a lot number, and a manufacturing machine are written in the quality control information storage sections 11a32 to 11n32 with a combination of reflectivities of 70% and 10% using the weak-record laser beam 70. The data storage sections 11a3 to 11n3 may have memory areas for recording information other than the user specification information and the quality control information.

The same data as stored in the user specification information storage sections 11a31 to 11n31 may be stored in other memory locations for compensating for lack of the user specification information stored in the user specification information storage sections 11a31 to 11n31. Specifically, even if part of the user specification information stored in the user specification information storage sections 11a31 to 11n31 is destroyed, the user specification information can be read out correctly.

5-2 Record on optical information storage medium when irradiated with weak-record laser beam The irradiation of the weak-record laser beam 70 onto the grooves 11a to 11n of the function writable chip 11 of the optical information storage medium shown in FIG. 6(b) provides the following reflectivities.

1. the blank sections 11a1 to 11n1: the logical 1 is stored with a reflectivity of 10% in each of the blank sections 11a1 to 11n1
2. the synchronization sections 11a2 to 11n2: they store the same binary codes as those before irradiated with he weak-record laser beam using different combinations of reflectivities of 13% and 10% (the logical 0=a reflectivity of 13%, the logical 1=a reflectivity of 10%). For example, the binary code "101" in FIG. 6(d) is represented by a combination of reflectivities of 10%, 13%, and 10%, as shown in FIG. 6(d).
3. the data storage sections 11a3 to 11n3: the user specification information, as described above, is written in the user specification information storage sections 11a31 to 11n31. For example, a binary code "101010", as shown in FIG. 6(d), is stored using a combination of reflectivities of 10%, 70%, 10%, 70%, 10%, and 70%. The weak-record laser beam 70 is not irradiated on the quality control information storage sections 11a32 to 11n32.

5-3 Record on optical information storage medium when irradiated with strong-record laser beam The irradiation of the strong-record laser beam 80 onto the grooves 11a to 11n of the function writable chip 11 of the optical information storage medium shown in FIG. 6(d) provides the following reflectivities, as shown in FIG. 7(b).

1. the blank sections 11a1 to 11n1: they show a reflectivity of 10% equal to that provided by the irradiation of the weak-record laser.
2. the synchronization sections 11a2 to 11n2: they store the same binary codes as those before irradiated with the weak-record laser beam using the same combinations of reflectivities of 13% and 10%.
3. the data storage sections 11a3 to 11n3: the reflectivities representing the user specification information are changed. For example, the reflectivity representing the logical 1 of the binary code "101010" written in the user specification information storage sections 11a31 to 11n31 is changed from 10% to 0%, as shown in FIG. 7(b). This makes it impossible to reproduce the user specification information correctly.

5-4 Record on optical information storage medium when irradiated with erasing laser beam The irradiation of the erasing laser beam 95 onto the grooves 11a to 11n of the function writable chip 11 of the optical information storage medium changes all the reflectivities of the blank sections 11a1 to 11n1, the synchronization sections 11a2 to 11n2, and the data storage sections 11a3 to 11n3 to zero (0%) so that all the data are destroyed. Specifically, it becomes impossible to read the data out of the optical information storage medium 300 using the reproduction laser beam 90 and also to rerecord data thereon using either of the weak-record laser beam 70 and the strong-record laser beam 80.

The depth $d_1$ of each pit in the grooves 11a to 11n, as shown in FIG. 6(a), before the user specification information is recorded is determined based on ⅛ wavelength (=equivalent optical path) of each of the laser beams 70, 80, 90, and 95, taking the refractive index of the transparent substrate 1 into account. Specifically, the depth $d_1$ of each pit in the grooves 11a to 11n before the user specification information is recorded is smaller than those of pits formed by the weak-record laser beam 70 in the grooves 11a to 11n, showing reflectivities of 10% and 13%. The reason for this is that it is necessary to ensure a reflectivity of 70% or more in the groove 11a to 11n of the function writable chip 11 before the user specification is recorded in order to achieve the same reflectivity as that of a CD. For example, when the wavelength of each of the laser beams 70, 80, 90, and 95 is 780 nm, the pit depth $d_1$ is set to 50 nm.

FIGS. 6(a), 6(d), and 7(b) show the grooves 11a to 11n scanned by the laser beams 70, 80, and 95 from left to right, as viewed in the drawings, respectively.

FIG. 8 shows the blank sections 11a1 to 11n1 of the grooves 11a to 11n scanned by the reproduction laser beam 90 in a direction c in FIG. 5(a).

Each of the blank sections 11a1 to 11n1 of the grooves 11a to 11n before the user specification information is recorded stores, as described above, data represented by a logical 0 with a reflectivity of 70% and, after exposed to the weak- and strong-record laser beams 70 and 80, stores data represented by a logical 1 with a reflectivity of 10%. Therefore, determination of whether the user specification information is stored in the grooves 11a to 11n or not may be made only by scanning the blank sections 11a1 to 11n1 using the reproduction laser beam 90 in the direction c to monitor the logical state of the blank sections 11a1 to 11n1.

Figure 15:
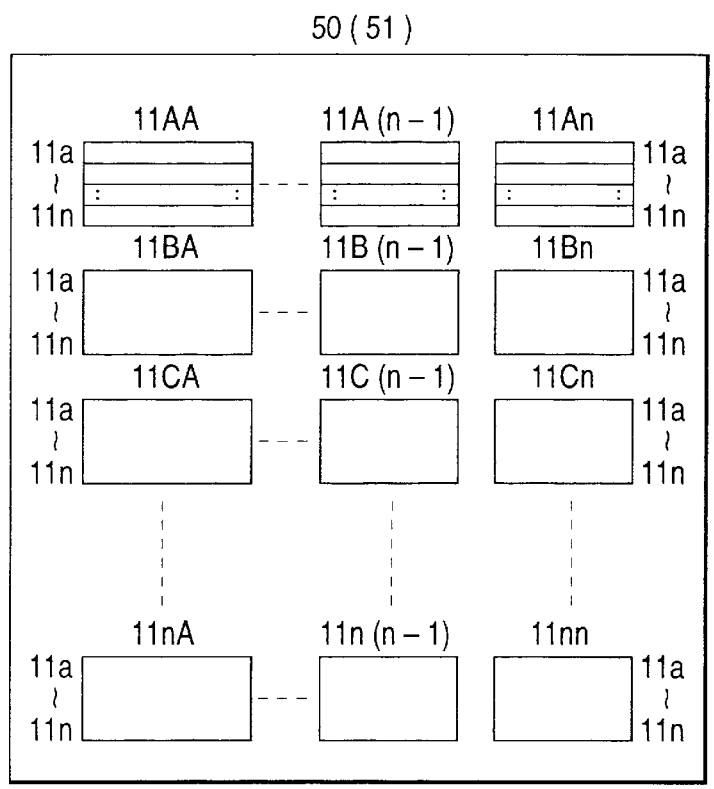
FIG. 15 shows a medium original plate and a stamper for mass-producing optical information storage media.

6 Manufacturing method of optical information storage medium 6-1 Function writable chip mastering An master plate 50, as shown in FIG. 15, has formed therein a large number of chip masters 11AA to 11nn (n=integer) for mass-producing function writable chips 11 in a matrix arrangement using the known compact disc mastering and replication techniques. The master plate 50 is illustrated as being rectangular in shape, but may be made of a disc. Each of the function writable chips 11 has formed therein, for example, 150 straight grooves 11a to 11n. The number of the chip masters 11AA to 11nn may be changed according to the production efficiency and the number of the optical information storage mediums 300 to be manufactured. The number of the grooves 11a to 11n formed in each of the function writable chips 11 may be changed according to the specifications of the optical information storage mediums 300.

A sequence of manufacturing processes of the master plate 50 will be described below.

First, a photoresist is applied to the entire surface of a glass plate.

Areas on the glass plate other than areas where the grooves 11a to 11n of each of the function writable chips 11 are to be formed are masked and then exposed to a laser using a laser exposure device to etch tracks in the glass plate for forming the grooves 11a to 11n. Afterwards, the mask on the glass plate is removed.

A conductive coating is applied to the glass plate.

The glass plate to which the conductive coating is applied is electroplated to form a metallic film thereon (i.e., a metal father).

Finally, the metallic film is peeled from the glass plate to form a stamper 51 (i.e., a replica of the master plate 50) on which molds are formed for forming the function writable chips 11.

The use of the stamper 51 allows, for example, 100 function writable chips 11 to be produced at a time, as discussed below.

6-2 Replication of function writable chip

First, the stamper 51 is mounted on a replication device substantially identical with a known CD manufacturing device and then filled with an optically transparent member such as polycarbonate to form the transparent substrate 1 capable of producing the 100 function writable chips 11.

An organic functional dye is applied as a recording material to blank grooves formed in the transparent substance 1 which correspond to the data storage sections 11a3 to 11n3 to form the organic film 2 in each of the blank grooves.

A reflective material is applied to the entire surface of the transparent substance 1 to form the metallic film 3.

An optically transparent material such as polycarbonate is applied to the metallic film 3 to form the protecting film 4.

Finally, the transparent substrate 1 is cut into one hundred (100) each having one function writable chip 11.

6-3 Fabrication of optical information storage medium

The function writable chip 11 is attached to a preselected place on the base 10 using adhesive or melting techniques. The read-only chip 12 is also installed on the base 10 to fabricate the optical information storage medium 300 as shown in FIG. 3.

An optical recording/reproducing device will be described below which records, reproduces, and erases data in and from the optical information storage medium 300.

7 Basic structure of optical recording/reproducing device

FIGS. 11 to 14 show the optical recording/reproducing device 500 designed to record, reproduce, and erase data in and from the optical information storage medium 300.

The optical recording/reproducing device 500 has functions of the manufacturer's data recording device used in producing the optical information storage medium 300, the seller's data recording/reproducing device used in selling the optical information storage medium 300, and the data reproducing/erasing device used when the optical information storage medium 300 is employed as a prepaid card, as described above.

Figure 11:
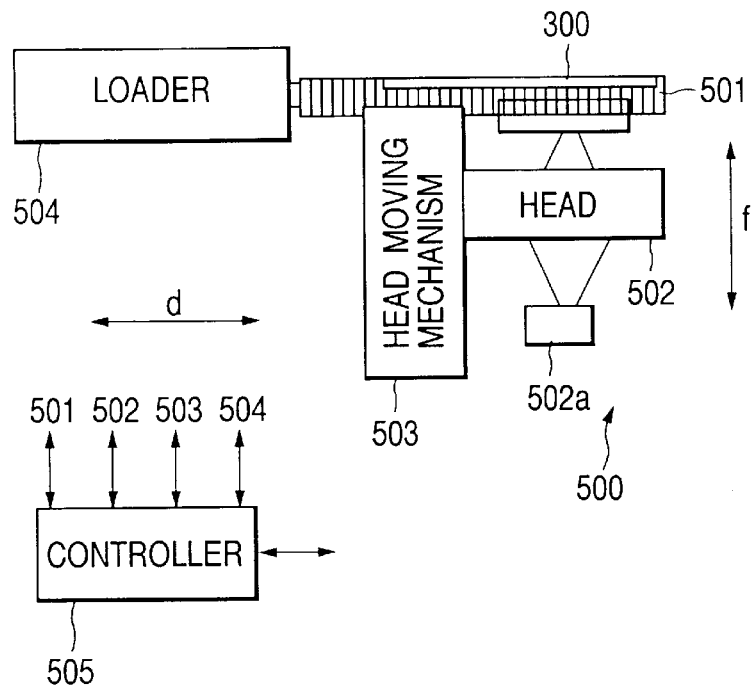
FIG. 11 is a block diagram which shows a mechanical structure of an optical recording/reproducing device.

The optical recording/reproducing device 500 includes generally, as shown in FIG. 11, an optical information storage medium holder 501, an optical head 502, a head moving mechanism 503, an optical information storage medium loader 504, and a controller 505. The optical head 502 is installed on the head moving mechanism 503.

The optical information storage medium holder 501 is disposed within a casing (not shown) and holds therein and moves the optical information storage medium 300 for allowing a laser beam (i.e., the weak- and strong-record laser beams 70 and 80, the reproduction laser beam 90, or the erasing laser beam 95) emitted from the optical head 502 to scan the grooves 11a to 11n formed in the function writable chip 11.

When the optical recording/reproducing device 500 is used as the manufacturer's data recording device or the seller's data recording/reproducing device, the optical head 502 may have a structure designed only for recording data. When the optical recording/reproducing device 500 is used as the data reproducing/erasing device, the optical head 502 is designed to have both data reproducing and erasing functions.

The optical information storage medium holder 501 includes, as shown in FIG. 12, the feeding guide rail 501a, the feeding gear rack 501b, and a positioning mechanism 501c. The feeding guide rail 501a and the feeding gear rack 501b are arranged on the same plane and engage the right and left sides 10c and 10d of the optical information storage medium 300 loaded into the holder 501 from the direction d to orient the optical information storage medium 300. The positioning mechanism 501c positions the lower side 10b of the optical information storage medium 300. This orients the optical information storage medium 300 so that the lengthwise direction, as indicated by an arrow b, of the grooves 11a to 11n of the function writable chip 11 are perpendicular to the loading direction d.

Figure 14:
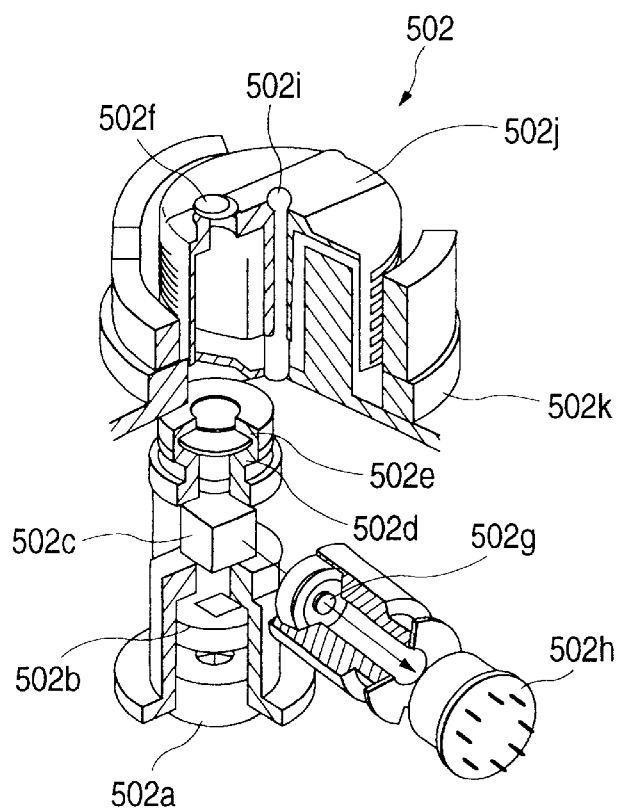
FIG. 14 is a perspective view which shows an optical head.

The optical head 502 is designed to record, reproduce, and erase data in and from the grooves 11a to 11n of the function writable chip 11 of the optical information storage medium 300 loaded into the holder 501 and includes, as shown in FIG. 14, a laser diode (light source) 502a, a diffraction grating 502b, a polarizing prism (beam splitter) 502c, a collimation lens 502d, a quarter-wave plate 502e, an objective 502f, a cylindrical lens 502g, a detector (photodiode) 502h, a shaft 502i, two-axis device 502j, and a magnet 502k.

When the optical recording/reproducing device 500 is used as the manufacturer's data recording device and the seller's data recording/reproducing device, the optical head 502 is designed to emit the weak-record laser beam 70. When the optical recording/reproducing device 500 is used as the data reproducing/erasing device reproducing and erasing the data from the optical information storage medium 300, the optical head 502 is designed to switch among a strong-record mode to emit the strong-record laser beam 80, a data erasing mode to emit the erasing laser beam 95, and a data reproducing mode to emit the reproduction laser beam 90.

A laser beam emitted from the laser diode 502b reaches through the objective 502f the grooves 11a to 11n of the function writable chip 11 on the optical information storage medium 300. The laser beam reflected from the function writable chip 11 enters the objective 502f and reaches the photodiode 502h through the beam splitter 502c. The photodiode 502h converts the input light into electric signals part of which is used as a reproduced signal indicating a variation in reflectivity of each of the grooves 11a to 11n when the data is read out of the function writable chip 11.

When data, especially the user specification information is read out of the reproduced signal, conventional error correction is performed to fix errors occurring in the reproduced signal caused by optical defects such as dirt on and/or damage of the surface of the optical information storage medium 300.

The output signal from the photodiode 502h is also used to position the objective 502f accurately and quickly in vertical and horizontal directions, as indicated by arrows f and g in FIGS. 11 and 12, under focus and tracking servo control through the two-axis device 502i and the magnet 502k. Specifically, the vertical position of the objective 502f (i.e., the direction f in FIG. 11) is adjusted under the focus servo control, while the horizontal position thereof (i.e., the direction g in FIG. 12) is adjusted under the tracking servo control.

The head moving mechanism 503 includes a pinion 503a, an intermediate gear 503b, an electric motor 503c such as a stepping motor, and a rotary encoder 503d. The pinion 503a meshes with the feeding gear rack 501b of the optical information storage medium holder 501. The feeding gear rack 501b is connected to the optical head 502. The rotary encoder 503d is responsive to a horizontal head movement control signal outputted from the controller 505 to provide an electric control signal to the motor 503c. The motor 503c rotates a controlled angle in a controlled direction according to the current level and polarity of the electric control signal from the rotary encoder 503d to provide the torque to the pinion 503a through the intermediate gear 503b. The rotation of the pinion 503a causes the feeding gear rack 501b to move, thereby moving the optical head 502 in the direction e, as shown in FIG. 12, perpendicular to the length of the grooves 11a to 11n of the function writable chip 11.

Figure 13:
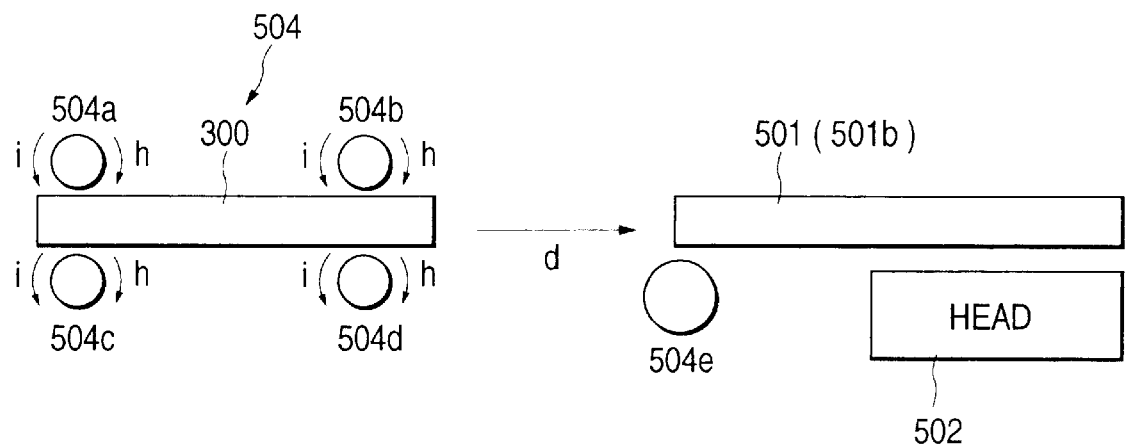
FIG. 13 is an illustration which shows an optical information storage medium loader and an optical information storage medium holder.

The optical information storage medium loader 504 is designed to transport the optical information storage medium 300 inserted into a loading slot (not shown) formed in the casing of the optical recording/reproducing device 500 to a given location in the optical information storage medium holder 501 and includes, as shown in FIG. 13, four positioning rollers 504a to 504d rotatable in normal and reverse directions and a cleaner 504e. The positioning rollers 504a to 504d are illustrated as being arranged away from the optical information storage medium 300 for the sake of illustration, but, in practice, rotate in engagement with the optical information storage medium 300 along with positioning rollers (not shown) installed in the optical information storage medium holder 501.

The rotation of the positioning rollers 504a to 504d in the normal direction h causes the optical information storage medium 300 to be loaded into the holder 501 and stopped at the lower surface 10b by the positioning mechanism 501c. Alternatively, the rotation of the positioning rollers 504a to 504d in the reverse direction i causes the optical inform information storage medium 300 to be unloaded out of the holder 501 and transported to an ejecting slot (not shown) formed in the casing of the optical recording/reproducing device 500.

The controller 505 controls operations of the optical information storage medium holder 501, the optical head 502, the head moving mechanism 503, and the optical information storage medium loader 504 and recording, reproducing, and erasing operations of the optical recording/reproducing device 500.

8 Operation of optical recording/reproducing device

Operations of the optical recording/reproducing device 500 when used as the manufacturer's data recording device, the seller's data recording/reproducing device, and the data reproducing/erasing device will be described below.

8-1 Operation of manufacturer's data recording device

The controller 505 detects arrival of the optical information storage medium 300 at the loading slot of the manufacturer's data recording device and outputs a loading control signal to the optical information storage medium loader 504.

The optical information storage medium loader 504 is responsive to the loading control signal to rotate the positioning rollers 504a to 504d in the normal direction h, as shown in FIG. 13, to transport the optical information storage medium 300 to the cleaner 504e. The cleaner 504e then cleans the surface of the optical information storage medium 300, after which it is loaded into the optical information storage medium holder 501.

Upon entering the optical information storage medium holder 501, the optical information storage medium 300 is guided by the feeding guide rail 501a and the feeding gear rack 501b toward the positioning mechanism 501c. When the optical information storage medium 300 engages the positioning mechanism 501c, the positioning mechanism 501c outputs to the controller 505 a positioning completion signal indicating completion of positioning of the optical information storage medium 300 in the optical information storage medium holder 501.

The controller 505 is responsive to the positioning completion signal from the positioning mechanism 501c to a turnoff signal to the optical information storage medium loader 504 to arrest the rotation of the positioning rollers 504a to 504d, thereby holding the optical information storage medium 300 in a correct position.

The controller 505 then outputs a head movement control signal to the head moving mechanism 503 for moving the optical head 502 so that the weak-record laser beam 70 may be emitted on a leading portion of the first one of the grooves 11a to 11n of the function writable chip 11 (i.e., the left end of the groove 11a in FIG. 4(*a*)).

Specifically, the controller 505 first outputs the horizontal head movement control signal to the rotary encoder 503*d* of the head moving mechanism 503. The rotary encoder 503*d* is responsive to the horizontal head movement control signal from the controller 505 to actuate the motor 503*c* to rotate the pinion 503*a* through the intermediate gear 503*b* a controlled angle in a controlled direction, thereby moving the feeding gear rack 501*b* in the horizontal direction e, as shown in FIG. 12, to bring the optical head 502 into alignment with the leading portion of the first groove 11a in the vertical direction.

Upon receiving from the head moving mechanism 503 a movement completion signal indicating completion of the movement of the feeding gear rack 501*b*, the controller 505 provides a vertical scanning signal to the optical head 502 to actuate the two-axis device 502*j* so that the objective 502*f* may trace the first groove 11a in a lengthwise direction thereof, as indicated by the arrow b in FIG. 12, under the tracking servo control as described above.

The controller 505 monitors a travel distance of the optical head 502 from a leading portion of the blank section 11a1 of the groove 11a to detect arrival of the optical head 502 at a leading portion of the quality control information storage section 11a32 in the data storage section 11a3 of the groove 11a (i.e., time t8 in FIG. 6(*c*)) and then outputs a laser-on signal to the optical head 502.

The optical head 502 is responsive to the laser-on signal from the controller 505 to activate the laser diode 502*a* to emit the weak-record laser beam 70. The weak-record laser beam 70 then reaches the leading portion of the quality control information storage section 11a32 and scans it in the lengthwise direction continuously to record the quality control information, as described above.

Upon detection of arrival of the optical head 502 at the end of the quality control information storage section 11a32 based on the travel distance of the optical head 502 from the leading portion of the blank section 11a1 of the groove 11a, the controller 505 outputs a laser-off signal to the optical head 502.

The optical head 502 is responsive to the laser-off signal to deactivate the laser diode 502*a* to arrest the emission of the weak-record laser beam 70.

Upon detection of arrival of the optical head 502 at the end of the groove 11a (i.e., the end of the blank section 11a5) based on the travel distance of the optical head 502 from the leading portion of the blank section 11a1 of the groove 11a, the controller 505 outputs a horizontal track shift signal to the head moving mechanism 503.

The head moving mechanism 503 is responsive to the horizontal tack shift signal to move the optical head 502 in the direction e, as shown in FIG. 12, into coincidence with a leading portion of second one of the grooves 11a to 11n (i.e., a leading portion of the blank section 11b1 of the groove 11b).

The above operations are repeated to record the quality control information over the quality control information storage sections 11a32 to 11n32 in the data storage sections 11a3 to 11n3 of the grooves 11a to 11n of the function writable chip 11.

The controller 505 monitors selected one (e.g., 11n32) of the quality control information storage sections 11a32 to 11n32 of the grooves 11a to 11n to determine whether the recording of the quality control information is completed or not. Upon detection of completion of the recording of the quality control information, the controller 505 provides an unloading signal to the optical information storage medium loader 504.

The optical information storage medium loader 504 is responsive to the unloading signal from the controller 505 to eject the optical information storage medium 300 from the holder 501 toward the optical information storage medium loader 504 through a mechanism (not shown). Upon reaching the positioning rollers 504*b* and 504*d* rotating in the reverse direction i, as shown in FIG. 13, the optical information storage medium 300 is attracted into the optical information storage medium loader 504 and transported to the ejecting slot of the manufacture's data recording/reproducing device 500.

8-2 Operation of seller's data recording/reproducing device

The seller's data recording/reproducing device is, as described above, used at a store to record the user specification information requested by a purchaser or user on the optical information storage medium 300 on which the quality control information and another data are still stored in the quality control information storage sections 11a32 to 11n32 and the synchronization sections 11a2 to 11n2 by the manufacturer. In the following discussion, it will be assumed that the optical information storage medium 300 is processed as a prepaid card.

When it is required to process the optical information storage medium 300 as 1,000 yen worth of a prepaid card, for example, 1,000 yen worth of money data is written only in first one (11a31) of the user specification information storage sections 11a31 to 11n31 of the grooves 11a to 11n. Alternatively, when it is required to process the optical information storage medium 300 as 10,000 yen worth of a prepaid card, 1,000 yen worth of money data is written in each of the user specification information storage sections 11a31 to 11j31 in ten of the grooves 11a to 11n.

Operations of the seller's data recording/reproducing device when processing the optical information storage medium 300 as 10,000 yen worth of a prepaid card will be discussed below.

When a purchaser puts cash in a slot (not shown) of the seller's data recording/reproducing device, the controller 505 determines a sum of the cash and shows it on a display (not shown). The purchaser pushes card type selection and number of cards buttons to select desired one from ten types of prepaid cards ranging from 1,000 yen to 10,000 yen in units of 1,000 yen and to determine a desired number of prepaid cards. The controller 505 determines whether the sum of the cash put by the purchaser is greater than or equal to a product of the amount of money to be recorded in each card and the number of cards selected by the purchaser. If the sum of the cash is greater, the controller 505 makes change to the purchaser.

The seller's data recording/reproducing device includes a card storage mechanism (not shown) storing therein a stack of optical information storage media on which the quality control information is still recorded by the manufacturer. The controller 505 outputs a transport control signal to the card storage mechanism to pick up one of the stack of optical information storage media and feed it to a loading slot of the optical information storage medium loader 504.

The controller 505 detects arrival of the optical information storage medium 300 at the loading slot of the optical information storage medium loader 504 and outputs a loading control signal to the optical information storage medium loader 504.

The optical information storage medium loader 504 is responsive to the loading control signal to rotate the positioning rollers 504a to 504d in the normal direction h, as shown in FIG. 13, to transport the optical information storage medium 300 to the cleaner 504e. The cleaner 504e then cleans the surface of the optical information storage medium 300, after which it is loaded into the optical information storage medium holder 501.

Upon entering the optical information storage medium holder 501, the optical information storage medium 300 is guided by the feeding guide rail 501a and the feeding gear rack 501b toward the positioning mechanism 501c. When the optical information storage medium 300 engages the positioning mechanism 501c, the positioning mechanism 501c outputs to the controller 505 a positioning completion signal indicating completion of positioning of the optical information storage medium 300 in the optical information storage medium holder 501.

The controller 505 is responsive to the positioning completion signal from the positioning mechanism 501c to a turnoff signal to the optical information storage medium loader 504 to arrest the rotation of the positioning rollers 504a to 504d, thereby holding the optical information storage medium 300 in a correct position.

The controller 505 then outputs a head movement control signal to the head moving mechanism 503 for moving the optical head 502 so that the weak-record laser beam 70 may be emitted on a leading portion of the first one of the grooves 11a to 11n of the function writable chip 11 (i.e., the left end of the groove 11a in FIG. 4(a)).

Specifically, the controller 505 first outputs the horizontal head movement control signal to the rotary encoder 503d of the head moving mechanism 503. The rotary encoder 503d is responsive to the horizontal head movement control signal to actuate the motor 503c to rotate the pinion 503a through the intermediate gear 503b a controlled angle in a controlled direction, thereby moving the feeding gear rack 501b in the horizontal direction e, as shown in FIG. 12, to bring the optical head 502 into alignment with the leading portion of the first groove 11a in the vertical direction.

Upon receiving from the head moving mechanism 503 a movement completion signal indicating completion of the movement of the feeding gear rack 501b, the controller 505 provides a vertical scanning signal to the optical head 502 to actuate the two-axis device 502j so that the objective 502f may trace the first groove 11a in a lengthwise direction thereof, as indicated by the arrow b in FIG. 12, under the tracking servo control as described above.

The controller 505 also outputs a laser-on signal to the optical head 502. The optical head 502 is responsive to the laser-on signal to activate the laser diode 502a to emit the weak-record laser beam 70. The weak-record laser beam 70 scans the blank section 11a1, the synchronization section 11a2, the user specification information storage section 11a31 in the data storage section 11a3, the synchronization section 11a4, and the blank section 11a5 of the first groove 11a except the quality control information storage section 11a32 to record 1,000 yen worth of money data as the user specification information on the groove 11a of the function writable chip 11.

Specifically, in the blank section 11a1, the logical 0 (i.e., a reflectivity of 70%) is, as shown in FIGS. 6(b) and 6(d), rewritten to the logical 1 (i.e., a reflectivity of 10%). In the synchronization section 11a2, reflectivities of 100% and 70% are changed to 13% and 10%, respectively, while the binary code "101" is maintained as is. In the user specification information storage section 11a31 of the data storage section 11a3, a binary code "101010" representing 1,000 yen worth of money data is recorded with a combination of reflectivities 10%, 70%, 10%, 70%, 10%, and 70%.

The controller 505, as discussed above, monitors a travel distance of the optical head 502 from the leading portion of the blank section 11a1 of the groove 11a to determine the position of the optical head 502. Upon detection of arrival of the optical head 502 at the end of the groove 11a (i.e., the end of the blank section 11a5), the controller 505 outputs a laser-off signal to the optical head 502 to arrest the emission of the weak-record laser beam 70.

The controller 505 then outputs a horizontal track shift signal to the head moving mechanism 503. The head moving mechanism 503 is responsive to the horizontal tack shift signal to move the optical head 502 horizontally to a leading portion of second of the grooves 11a to 11n (i.e., a leading portion of the blank section 11b1 of the groove 11b).

The above operations are repeated on first ten of the grooves 11a to 11n. Specifically, 1,000 yen worth of money data is recorded on each of the user specification storage sections 11a31 to 11j31 of the ten grooves 11a to 11j so that 10,000 yen worth of money data in total is written in the function writable chip 11.

Upon detection of completion of the recording of the user specification information, as described above, the controller 505 provides an unloading signal to the optical information storage medium loader 504.

The optical information storage medium loader 504 is responsive to the unloading signal from the controller 505 to eject the optical information storage medium 300 from the holder 501 toward the optical information storage medium loader 504. Upon reaching the positioning rollers 504b and 504d rotating in the reverse direction i, as shown in FIG. 13, the optical information storage medium 300 is attracted into the optical information storage medium loader 504 and transported to the ejecting slot of the seller's data recording/reproducing device 500.

8-3 Operation of data reproducing/erasing device

The data reproducing/erasing device is, as described above, used to partially or completely erase the money data (i.e., the user specification information) stored in the prepaid card (i.e., the optical information storage medium 300) when the user buys merchandise using the prepaid card. Specifically, the data reproducing/erasing device reads the money data out of the function writable chip 11 to find the balance of the money data and subtracts the price of the purchase from the balance of the money data. If the money data is consumed in full, the prepaid card is not returned to the user or returned after the writable chip 11 is broken optically or physically so that it cannot be reused.

In the following discussion, it will be assumed that the user buys 1,000 yen worth of a commodity using 10,000 yen worth of a prepaid card.

When the user inserts the prepaid card into a card loader (not shown) of the data reproducing/erasing device correctly, the card is transported to an inlet of the optical information storage medium loader 504. If the card is inserted in an incorrect orientation, it is ejected out of the data reproducing/erasing device.

Upon detection of arrival of the card at the inlet of the optical information storage medium loader 504, the controller 505 outputs a loading control signal to the optical information storage medium loader 504.

The optical information storage medium loader 504 is responsive to the loading control signal to rotate the positioning rollers 504a to 504d in the normal direction h, as shown in FIG. 13, to transport the card to the cleaner 504e. The cleaner 504e then cleans the surface of the card and feeds it to the optical information storage medium holder 501.

Upon entering the optical information storage medium holder 501, the card is guided by the feeding guide rail 501a and the feeding gear rack 501b toward the positioning mechanism 501c. When the card engages the positioning mechanism 501c, the positioning mechanism 501c outputs to the controller 505 a positioning completion signal indicating completion of positioning of the optical information storage medium 300 in the optical information storage medium holder 501.

The controller 505 is responsive to the positioning completion signal from the positioning mechanism 501c to a turnoff signal to the optical information storage medium loader 504 to arrest the rotation of the positioning rollers 504a to 504d, thereby holding the card in a correct position.

The controller 505 then outputs a head movement control signal to the head moving mechanism 503 for moving the optical head 502 so that the reproduction laser beam 90 may be emitted on a leading portion of the first one of the grooves 11a to 11n of the function writable chip 11 (i.e., the left end of the groove 11a in FIG. 4(a)) mounted on the card.

Specifically, the controller 505 first outputs the horizontal head movement control signal to the rotary encoder 503d of the head moving mechanism 503. The rotary encoder 503d is responsive to the horizontal head movement control signal to actuate the motor 503c to rotate the pinion 503a through the intermediate gear 503b a controlled angle in a controlled direction, thereby moving the feeding gear rack 501b in the horizontal direction e, as shown in FIG. 12, to bring the optical head 502 into alignment with the leading portion of the first groove 11a in the vertical direction.

Upon receiving from the head moving mechanism 503 a movement completion signal indicating completion of the movement of the feeding gear rack 501b, the controller 505 outputs a laser-on signal to the optical head 502. The optical head 502 is responsive to the laser-on signal to activate the laser diode 502a to emit the reproduction laser beam 90 onto the blank section 11a1 of the first groove 11a of the function writable chip 11. Simultaneously, the controller 505 provides a vertical scanning signal to the optical head 502 to actuate the two-axis device 502j so that the objective 502f may trace the blank sections 11a1 of the groove 11a a lengthwise direction thereof, as indicated by the arrow b in FIG. 12, under the tracking servo control as described above and then provides a horizontal scanning signal to the head moving mechanism 503 to bring the optical head 502 into coincidence with the blank section 11a2 of the second groove 11b.

The above operations are repeated so that the reproduction laser beam 90 scans all the blank sections 11a1 to 11n1 in a direction, as indicated by the arrow c in FIG. 5(a).

The prepaid card loaded into the data reproducing/erasing device, as already discussed, shows a reflectivity of 10% in each of the blank sections 11a1 to 11j1 of first ten of the grooves 11a to 11n of the function writable chip 11 whose user specification information storage sections 11a31 to 11j31 store therein the 10,000 yen worth of money data, while the other blank sections 11k1 to 11n1 each show a reflectivity of 70%, and the user specification information storage sections 11k31 to 11j31 do not store the user specification information at all. The determination of whether 1,000 yen worth of money data is stored in each of the grooves 11a to 11j or not may, thus, be made only by scanning all the blank sections 11a1 to 11n1 using the reproduction laser beam 90 to monitor a variation in reflectivity of the blank sections 11a1 to 11n1.

The controller 505 then determines whether the 1,000 yen worth of money data (i.e., the binary code "101010") stored in each of the user specification information storage sections 11a31 to 11j31 of first ten of the grooves 11a to 11n is not yet consumed or not in the following manner.

The controller 505 moves the optical head 502 just above the leading portion of the first groove 11a in the same manner, as discussed above, and provides a laser-on signal thereto. The optical head 502 is responsive to the laser-on signal to activate the laser diode 502a and scans the blank section 11a1, the synchronization section 11a2, the user specification information storage section 11a31 of the data storage section 11a3, the quality control information storage section 11a32, the synchronization section 11a4, and the blank section 11a5 of the first groove 11a continuously using the reproduction laser beam 90.

If the logical 1, the binary code "101", and the binary code "101010", as shown in FIG. 6(d), are read out of the blank section 11a1, the synchronization section 11a2, and the user specification information storage section 11a31 of the groove 11a, the controller determines that the 1,000 yen worth of money data is left in the groove 11a. Alternatively, if reflectivities other than 70% and 10% is detected in the user specification information storage section 11a31, then the controller 505 determines that the 1,000 worth of money data stored in the user specification information storage section 11a31 has already been consumed.

The above operation is repeated to determine whether the 1,000 worth of money data is left in each of the ten grooves 11a to 11j or not. If a combination of reflectivities 10%, 70%, 10%, 70%, 10%, and 70% is detected in each of the user specification information storage sections 11a31 to 11c31 of first three of the grooves 11a to 11n, and a combination of reflectivities 0%, 70%, 0%, 70%, 0%, and 70%, as shown in FIG. 7(b), is detected in each of the user specification information storage sections 11d31 to 11j31 following the third user specification information storage section 11c31, the controller 505 determines that 3,000 yen worth of money data is left in the card and shows it on a display of the data reproducing/erasing device 500.

When the card user depresses a commodity selection button provided on the data reproducing/erasing device 500 for buying a commodity whose price is 1,000 yen, for example, the controller 505 provides a signal indicating thereof to a vending machine (not shown). The vending machine then provides the selected commodity to the card user.

The data reproducing/erasing device 500 erases 1,000 yen worth of money data from the function writable chip 11 of the card in the manner as discussed below.

First, the controller 505 moves the optical head 502 just above the leading portion of the user specification information storage section 11c of the third groove 11c in the same manner, as discussed above, and provides an erasing laser-on signal thereto. The optical head 502 is responsive to the erasing laser-on signal to change a light quantity mode of the laser diode 502a so as to emit the strong-record laser beam 80. The strong-record laser beam 80 then scans the user specification information storage section 11c to erase the 1,000 yen worth of money data. Specifically, the combination of reflectivities 10%, 70%, 10%, 70%, 10%, and 70% of the user specification information storage section 11c is changed to the combination of reflectivities 0%, 70%, 0%, 70%, 0%, and 70%, as shown in FIG. 7(b).

9 Reproduction of optical information storage medium

The reproduction of the optical information storage medium 300 is performed using, for example, the above discussed data reproducing/erasing device in the following manner.

The controller 505 actuates the optical information storage medium loader 504 to transport the optical information storage medium 300 to the optical information storage medium loader 504.

Upon entering the optical information storage medium holder 501, the optical information storage medium 300 is guided by the feeding guide rail 501a and the feeding gear rack 501b toward the positioning mechanism 501c. When the optical information storage medium 300 engages the positioning mechanism 501c, the positioning mechanism 501c outputs to the controller 505 a positioning completion signal indicating completion of positioning of the optical information storage medium 300 in the optical information storage medium holder 501.

The controller 505 is responsive to the positioning completion signal from the positioning mechanism 501c to a turnoff signal to the optical information storage medium loader 504 to arrest the rotation of the positioning rollers 504a to 504d, thereby holding the optical information storage medium 300 in a correct position.

The controller 505 controls the head moving mechanism 503 in the same manner as described above to move the optical head 502 just above the leading portion of the first groove 11a and activates the laser diode 502a to emit the reproduction laser beam 90. The reproduction laser beam 90 first scans the blank sections 11a1 to 11n1 of all the grooves 11a to 11n in the direction c, as shown in FIGS. 5(a) and 8, perpendicular to the lengthwise direction of the grooves 11a to 11n prior to scanning the synchronization sections 11a2 to 11n2 and the data storage sections 1 11a3 to 11n3.

The controller 505 monitors the laser beam reflected from the blank sections 11a1 to 11n1 to measure reflectivities thereof and determines whether the reflectivity of each of the blank sections 11a1 to 11n1 is 10% or 70%. If one of the blank sections 11a1 to 11n1 shows a reflectivity of 10%, then the controller 505 determines that the user specification information is stored in corresponding one of the user specification information storage sections 11a31 to 11n31 without being erased and controls the optical head 502 to scan the corresponding one of the user specification information storage sections 11a31 to 11n31 using the reproduction laser beam 90 for reproducing the user specification information stored therein.

Alternatively, if one of the blank sections 11a1 to 11n1 shows a reflectivity of 70%, then the controller 505 determines that the user specification information is not yet recorded on corresponding one of the user specification information storage sections 11a31 to 11n31 without scanning the corresponding one of the user specification information storage sections 11a31 to 11n31 using the reproduction laser beam 90.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of:

recording scanning guide information on at least one of the scanning guide sections using a binary code represented by second and fourth of first to fifth signal levels;

recording address information on at least one of the address storage sections using a binary code represented by one of a first combination of the first and the second of the first to the fifth signal levels and a second combination of third and fourth of the first to the fifth signal levels; and recording specification information on at least one of the specification information storage sections using a binary code represented by the second and the fourth of the first to the fifth signal levels, wherein the first to the fifth signal levels bear a relation of the first signal level>the second signal level>the third signal level>the fourth signal level>the fifth signal level.

2. A method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of:

recording scanning guide information on at least one of the scanning guide sections at second of first to fifth signal levels;

recording address information on at least one of the address storage sections using a binary code represented by the first and the second of the first to the fifth signal levels; and recording specification information on at least one of the specification information storage sections at the second signal level, wherein the first to the fifth signal levels bear a relation of the first signal level>the second signal level>the third signal level>the fourth signal level>the fifth signal level.

3. A method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of:

performing a first recording operation including the steps of (a) recording scanning guide information on at least one of the scanning guide sections at second of first to fifth signal levels, (b) recording address information on at least one of the address storage sections using a binary code represented by the first and the second of the first to the fifth signal levels, and (c) recording information on at least one of the specification information storage sections at the second signal level; and performing a second recording operation including the steps of (d) recording another scanning guide information on at least one of the scanning guide sections at the fourth of the first to the fifth signal levels and (e) recording specification information on at least one of the specification information storage sections using a binary code represented by the second and the fourth of the first to the fifth signal levels, wherein the first to the fifth signal levels bear a relation of the first signal level>the second signal level>the third signal level>the fourth signal level>the firth signal level.

4. A method of recording information on an optical information storage medium including a plurality of memory areas formed on a substrate, each including a writable region and a read-only region, each of the writable regions including a specification information storage section, each of the read-only regions including an address storage section and a scanning guide section, comprising the steps of:

performing a first recording operation including the steps of (a) recording scanning guide information on at least one of the scanning guide sections at second of first to fifth signal levels, (b) recording address information on at least one of the address storage sections using a binary code represented by the first and the second of the first to the fifth signal levels, and (c) recording information on at least one of the specification information storage sections at the second signal level;

performing a second recording operation including the steps of (d) recording another scanning guide information on at least one of the scanning guide sections at the fourth of the first to the fifth signal levels and (e) recording specification information on at least one of the specification information storage sections using a binary code represented by the second and the fourth of the first to the fifth signal levels;

performing a third recording operation including the steps of (f) recording a binary code represented by the second and the fifth of the first to the fifth signal levels on at least one of the specification information storage sections to erase the stored specification information therefrom, wherein the first to the fifth signal levels bear a relation of the first signal level>the second signal level>the third signal level>the fourth signal level>the fifth signal level.

5. A method as set forth in claim 4, further comprising the step of performing a fourth recording operation of changing the second signal level of the binary code stored in the at least one of the specification information storage sections to the fifth signal level.

6. A method as set forth in claim 4, wherein each of the first to fifth signal levels is represented by reflectivity that is a ratio of energy carried by a beam of light which is reflected from one of the memory areas to energy carried by the beam of light which is incident on the one of the memory areas.

7. A method as set forth in claim 6, wherein the first to fifth signal levels are represented by different five of reflectivities ranging from 0% to 100%.

8. A method as set forth in claim 6, wherein the first to fifth signal levels are represented by reflectivities of 100%, 70%, 13%, 10%, and 0%, respectively.

9. A method as set forth in claim 5, wherein recording beams of light used in the second to fifth recording operations have first to third quantities of light, respectively, which bear a relation of the first quantity of light<the second quantity of light<the third quantity of light.

* * * * *